(12) United States Patent
Eidsnes et al.

(10) Patent No.: US 7,708,872 B2
(45) Date of Patent: May 4, 2010

(54) ACTUATOR IN A MICROFLUIDIC SYSTEM FOR INDUCING ELECTROOSMOTIC LIQUID MOVEMENT IN A MICRO CHANNEL

(75) Inventors: Trond Eidsnes, Bergen (NO); Olav Ellingsen, Florø (NO); Trond Heldal, Bergen (NO); Natalyia Mishchuk, Kiev (UA)

(73) Assignee: Osmolife AS, Bergen (NO)

( * ) Notice: Subject to any disclaimer, the term of this patent is extended or adjusted under 35 U.S.C. 154(b) by 1012 days.

(21) Appl. No.: 10/517,835

(22) PCT Filed: Jul. 15, 2003

(86) PCT No.: PCT/NO03/00246

§ 371 (c)(1),
(2), (4) Date: Dec. 15, 2004

(87) PCT Pub. No.: WO2004/007348

PCT Pub. Date: Jan. 22, 2004

(65) Prior Publication Data

US 2005/0230251 A1    Oct. 20, 2005

(30) Foreign Application Priority Data

Jul. 15, 2002    (NO) .................................. 20023398

(51) Int. Cl.
*G01N 27/447*    (2006.01)
*G01N 27/453*    (2006.01)

(52) U.S. Cl. ...................... 204/451; 204/450; 204/601; 204/600

(58) Field of Classification Search ......... 204/600–605, 204/450–455
See application file for complete search history.

(56) References Cited

U.S. PATENT DOCUMENTS

| | | | | |
|---|---|---|---|---|
| 4,540,403 A | * | 9/1985 | Theeuwes | .................... 604/85 |
| 5,985,119 A | * | 11/1999 | Zanzucchi et al. | .......... 204/450 |
| 6,149,787 A | * | 11/2000 | Chow et al. | ................. 204/451 |
| 6,413,401 B1 | | 7/2002 | Chow et al. | |
| 6,677,832 B1 | * | 1/2004 | Guinn et al. | ................. 333/116 |
| 6,685,810 B2 | * | 2/2004 | Noca et al. | .................. 204/450 |
| 2003/0164296 A1 | | 9/2003 | Squires et al. | |

OTHER PUBLICATIONS

Todd M. Squires, Martin Z. Bazant, Nov. 26, 2001, Harvard and MIT University.*
Nonlinear electrokinetic phenomena, M. Z. Bazant, in Li, Dongqing (ed), Encyclopedia of Microfluidics and Nanofluidics, Part 14, pp. 1461-1470 (Springer, Berlin, Heidelberg, New York, 2008). Downloaded from www.stanford.edu/group/bazant/papers on Dec. 9, 2008.*
"Electrokinetic Phenomena of the Second Kind and Their Applications", S.S. Dukhin, Advances in Colloid and Interface Science, 35 (1991) 173-196. Elsevier Science Publishers B.V., Amsterdam.
"Intensification of Electrodialysis Based on Electroosmosis of the Second Kind", S.S. Dikhin et al., Journal of Membrane Science, 79 (1993) 199-210, Elsevier Science Publishers, B.V., Amsterdam.
"Electro-Osmosis of the Second Kind Near the Heterogeneous Ion-Exchange Membrane", N.A. Mishcuk, Colloids and Surfaces A: Physicochemical and Engineering Aspects 140 (1998( 75-89.
"Electroosmosis of the Second Kind", N.A. Mishchuk et al., Colloids and Surface A: Physicochemical and Engineering Aspects 95 (1995), 119-131. Ukraine.

* cited by examiner

*Primary Examiner*—Alex Noguerola
(74) *Attorney, Agent, or Firm*—Birch, Stewart, Kolasch & Birch, LLP

(57) ABSTRACT

The present invention describes an actuator in a microfluidic system for inducing an electroosmotic liquid movement in a microchannel.

49 Claims, 20 Drawing Sheets

ACTUATOR IN A MICROFLUIDIC SYSTEM FOR INDUCING ELECTROOSMOTIC LIQUID MOVEMENT IN A MICRO CHANNEL

FIELD OF INVENTION

The present invention relates to an actuator in a microfluidic system for inducing an electroosmotic liquid movement in a microchannel.

BACKGROUND OF THE INVENTION

Much research is currently put into developing electroosmotic and other micropumps for microfluidic systems (which is a sort of micro electromechanical systems (MEMS) or microsystem technology (MST)).

Microfluidics is an emerging technology which is expected to get vast implications in a number of technical fields. A microfluidic device typically consists of a number of microsensors or microanalyzers, connected to each other and the environment by microchannels. The liquid to be analyzed or delivered as well as reagents should preferably be pumped by means of microfabricated pumps. While the other components have already been commercially available for some time, the development of microactuators/-pumps is still at an early stage and several problems remains to be solved. Thus, the real breakthrough and commercialization of this technology is expected to come when improved actuators have been developed. It is an object of the present invention to provide actuators for microfluidic systems which are suited as micropumps or mixers with an improved flow through of fluid.

One class of known micropumps is the reciprocating pumps, which involves mechanical actuations. Usually, a membrane is actuated by piezoelectric, electrostatic or other forces. Common to them is the involvement of moving parts, which complicates fabrication and may reduce their useful life.

Field-induced flow pumps include electrohydrodynamic (EHD), magnetohydrodynamic (MHD) and electroosmotic (EO) pumps. One obvious advantage is the lack of movable parts. However, these pumps have a requirement for high voltages, with EO pumps being the most versatile.

Further, the EHD pumps are restricted to non-conducting liquids, ruling out all applications where a solution of significant ion concentration should be transported (e.g. body fluids). Also, high voltages are needed. PCT WO 02/07292 A2 describes an EHD micropump operating at 25 kV.

MHD pumps on the other hand are restricted to conducting solutions, omitting applications with very dilute solutions.

Electroosmotic (EO) micropumps is considered an especially promising technology for many applications, as it is relatively simple to fabricate, and good performance can be obtained for a wide range of concentrations. However, several technological challenges still remain to be solved. The main problems are i) electrode gas evolution, ii) electrochemical reactions, iii) stability and iv) need for large electric potentials. These challenges will be detailed below:

Electrode gas evolution: Relatively strong electric fields must be applied, and a direct current component is necessary. This results in gas evolution on the electrodes.

Electrochemical reactions: These reactions are responsible for the gas evolution and may also occur in other part of the system. In cooling applications, de-ionized water cold be used as liquid medium, resulting in the formation of $H_2$ and $O_2$ gas only. However, for "lab-on-a-chip"—applications, fluids could be altered due to reactions, which could influence or ruin the analysis or system operation. Also, substances harmful to the system could be produced, e.g. corrosive gases like $Cl_2$ resulting from electrolysis of NaCl solutions. In addition, reaction products and concomitant pH changes can also influence the pump surface potential, resulting in altered electro osmotic characteristics, e.g. reverse flow.

Stability: In addition to the influence of electrochemical reactions, establishment of pore concentration profiles along pore axis in a direct electric field may hamper the EO transport over time. Also, various phenomena like diffusiophoresis and osmosis might reduce the flow. Thus, DC electroosmosis usually degrades over time, ultimately zero flow is obtained, due to the side-effects described. These effects can be reduced by using a pulsating field, but as classical EO is linear in the field, the DC component must always be present, and thus the side effects also to some degree.

Large electric potentials (kV range) are usually required, demanding expensive and bulky (reducing portability) power-supplies. Also, this leads to danger in the case of leakage currents, especially for devices to be used close to the body.

PCT WO 02/070118 A2 discloses a microfabricated pump, where the problem of electrode gas evolution is met by separating the channel from the electrodes by a non-porous ion-conducting membrane. The gas bubbles are allowed to escape from the electrode chamber to the environment. Drawbacks include the need for an open structure, possible production of harmful reaction products and relatively complicated structure.

US 2003/0085024 A1 describes a cooling device with an EO micropump with separate chambers for catalytic gas recombination (platinum catalyst). This device is limited to pure or buffered water as the working fluid. As it is not guaranteed that the gas recombination is complete, gas is also allowed to escape the system through a membrane. Good pump performance was obtained, but without obtaining complete gas recombination. Obvious disadvantages of this system are the cost of catalyst, and size of recombiner. Also, the combiner was only designed to deal with the dissociation products of pure water, not e.g. $Cl_2$ formed from NaCl solutions. A 2 kV electric potential difference was applied.

In U.S. Pat. No. 6,568,910 B1 an EO pump is described, for which the liquid is pumped from a first channel containing electrodes into and through a second channel where no electric field is present. Again, this solution is aimed at avoiding the electrode gas evolution to take place in the microchannel of primary interest.

In [J. G. Santiago, "electroosmotic flows in microchannels with finite inertial and pressure forces", Anal. Chem., 73: 2356-2365, 2001] is described a pump using a capillary containing a porous frit of 3.5 µm silica particle for reducing pore-size (and thus increasing pressure). A flow of 3.6 µl/min was achieved using 2 kV potential difference. Deionized water was used as the working fluid, but still gas evolution was observed at the electrodes. Pumps with channel diameter 0.5 and 0.7 mm were used, while the length of the porous frit was 5.4 cm.

Using an open glass channel of dimensions 1 mm (length), 0.9 mm (height) and 38 mm (width), an electroosmotic velocity degrading from 15 to 0.2 µl/min in two months was obtained [Chen, C. H., Zeng, S., Mikkelsen J. C. and Santiago, J. G. "Development of a Planar Electrokinetic Micropump", Department of Mechanical Engineering, Stanford University]. The potential difference was 1 kV. Again, deionized water was used as working fluid, but electrode reactions (gas evolution) were present.

Because of small channel size, the Reynolds number is low and the flow normally laminar. As a consequence, mixing mainly takes place by diffusion, which is in many cases efficient in micrometer dimensions. However, for large molecules (e.g. DNA), bacteria and cells, convection is the only way to achieve rapid mixing. Different methods have been tested for introducing chaotic flows in microchannels, but this is still considered a challenge.

The paper [Shishi, Q. and Haim H. Bau. "A Chaotic Electroosmotic Stirrer", Anal. Chem., 74(15):3616-3625, 2002] describes a solution where mixing was possible by varying the wall surface potential in time and along the channel length coordinate, which could be done by introducing field effect control in short adjacent channel sections, by means of several electrodes and a control unit. This system has the drawback of having a relatively complicated structure.

An electrokinetic instability micromixer was also produced by using a sinusoidally electric field above 100 V/mm [Oddy, M. H., Santiago, J. G. and Mikkelsen, J. C. Anal. Chem. 73, 5822-5832 (2001)].

An EO driven micropump for insulin delivery is described in [E. L. P. Uhlig, W. F. Graydon, and W. Zingg. "The Electro-Osmotic Actuation of implantable Insulin Micropumps", Journal of Biomedical Materials Research, 17:931-943, 1983]. The electrochemical cell (Ag|AgCl|NaCl| cation exchange membrane |NaCl|AgCl|Ag) was used for actuation, where the current was reversed every 10 minutes. The reversing was necessary in order not to run the reactions in one direction until termination, after which little or no current would flow. An electro-magnetically controlled valve was used to obtain uni-directional flow in a secondary channel despite the current reversals. This channel was in contact with a metal bellows containing the insulin, which could then be pumped into the body. This system has the drawback of being complicated, and involving moving parts.

Further prior art is described in US2003164296A1, U.S. Pat. No. 5,985,119, and in the following publications:

Dukhin S. S.: "Electrokinetic phenomena of the second kind and their applications" ADVANCES IN COLLOID AND INTERFACE SCIENCES vol. 35, 1991, Elsevier Science Publishers B. V. Amsterdam, pages 173-196, XP002976010.

Dukhin S. S.: et al: "Intensification of electrodialysis based on electroosmosis of the second kind" JOURNAL OF MEMBRANE SCIENCE vol. 79, 1993, Elsevier Science Publishers B. V. Amsterdam, pages 199-210, XP002974593.

Mishchuk N. A.: "Electro-osmosis of the second kind near the heterogeneous ion-exchange membrane" COLLOIDS AND SURFACES A: PHYSICOCHEMICAL AND ENGINEERING ASPECTS vol. 140, 1998, pages 75-89, XP002974594.

Mishchuk N. A. et al: "Electroosmosis of the second kind" COLLOIDS AND SURFACE A: PHYSICOCHEMICAL AND ENGINEERING ASPECTS vol. 95, 1995, Ukraine, pages 119-131, XP002976009.

It is clear that even if EO micropumps have several advantages, important problems are not satisfactory solved by the current state of the art. Generally, the electrode gas evolution problem is met by i) using special liquids (deionized water and possibly a buffer) which limits the field of applications greatly, or ii) by moving the electrodes away from the area of EO pumping, to some device where gas bubbles can escape. The latter requires even larger potentials as the potential difference is proportional to the electrode distance. It also makes the design more complicated, especially if the structure involves several pumps with respective electrode pairs.

It is an object of the present invention to develop new actuators for which the technological challenges are solved. Specifically, it is an object of the present invention to provide an actuator which can be driven with no DC signal using much lower potentials, and being less influenced by the system chemistry. In many cases, it will be possible to arrange the electrodes close to the pump, which brings the minimum voltage further significantly down, and is excellent for producing multi-pump systems. Further, it is an object to provide a solution with much higher flow velocities than can be obtained by prior art solutions. Further, it is an object to provide actuators which can be used for mixing liquids in microchannels, which is also a challenge in microfluidics. For most designs, the actuator in accordance with the present invention can operate reversibly, showing identical pumping characteristics in either direction.

It is an object of the invention to provide microchannels which are capable of transporting a fluid from the inlet of the channel to the outlet Compared to known prior art solutions based on traditional electroosmosis the microchannels according to the present invention provides an increased fluid flow, i.e. that the liquid is forced to flow through the microchannel with an increased flow rate. The net flow, i.e. the amount of liquid forced through the microchannel is increased. This improved flow is obtained by arranging conducting means with specific geometrical shapes in the microchannel. More precisely, a surface portion of said conducting means is curved, or inclined with respect to the electrical field applied to the microchannels.

The underlying theoretical concept for the invention is so called "electroosmosis of the second kind" (EO2) or "superfast electroosmosis". A number of conditions have to be fulfilled in order to obtain EO2, especially if directed transport shall be achieved.

Liquid transport by EO2 is 10-100 times faster than for classical electroosmosis (EO1) applying the same electric field strength E. Lowering the electrical field strength E reduces the problem with electrochemical reactions, and also reduces the dangers of possible leakage current, which is especially important for implantable devices, and devices to be used close to the body. In addition, the needs for high voltage generators are eliminated, reducing the system cost and size, while enhancing portablility.

Being non-linear in the electric field strength, EO2 also makes it possible to achieve directed liquid transport using an alternating electric field, with little or no direct field component. Thus, the stability problems mentioned above can be reduced or eliminated. In addition, electrode reactions (including electrode gas evolution) will also be reduced or eliminated in an alternating field, as the polarization current will be larger, and the faradayic current smaller for alternating fields.

The present invention will now be explained with reference to the following drawings and examples.

FIGS. 24 to 27 shows regions of electric field strengths for obtaining EO2, where E_min_WS is the minimum E for avoiding water dissociation (equation 5), E_max_SCR_flux (equation 4) or E_max_thin_SCR (equation 6) the upper limit of E for obtaining EO2, E_min_EO2 (equation 3) is the minimum field strength for obtaining EO2, while E_lower_EO2 is four times this, indicating the lower field strength were EO2 is significantly faster than EO1. The field strengths are plotted as function of ion concentration in the water (NaCl solutions), for different particle sizes (FIG. 24: Particle size a=10 μm, FIG. 25: Particle size a=100 μm, FIG. 26: Particle size a=1 mm., FIG. 27: Particle sizes a=1, 10, 100, 1000 μm in one figure).

Figure 28:
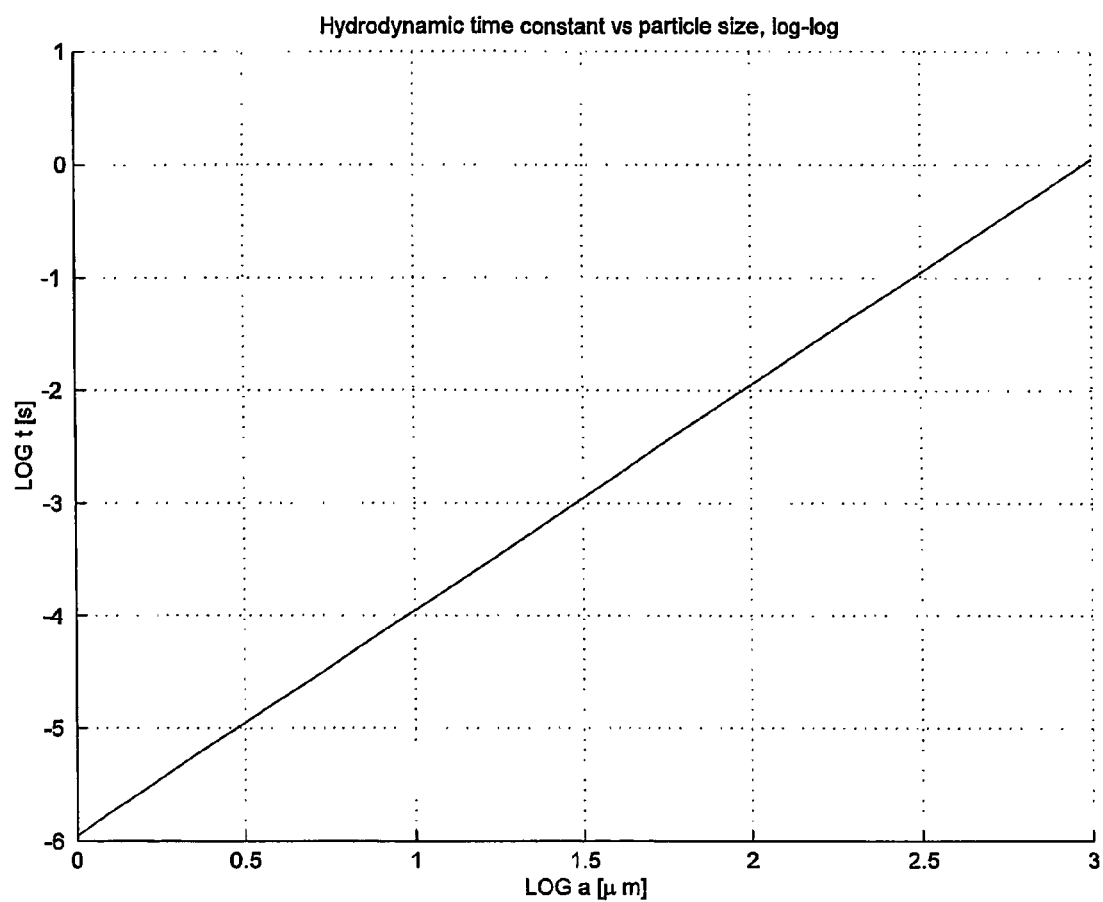

FIG. 28 shows the hydrodynamic time constant as function of concentration, for different particle sizes (equation 8). This determines the upper electric signal frequency.

DEFINITIONS OF TERMS USED IN THE SPECIFICATION AND CLAIMS

Microchannel: Channel for which at least one dimension is in the micrometer or nanometer range.

Microfluidic system: System for transport and manipulation of liquids in one or more microchannels, through each of which flowrates are between 1 nanoliter/min and 50 ml/min.

Actuator: a device for setting a liquid in motion, either by pumping it in one direction, or by introducing circular flow or mixing, or both. The actuator can work directly on the fluid of primary interest (e.g. samples to be analyzed and reagents). It can also be used for indirect actuation, e.g. setting the membrane of a peristaltic pump in motion by directly actuating a chosen liquid in contact with one side of the membrane, while the other side is in contact with the fluid of primary interest.

Smooth surface: By this should be understood that surface irregularities should be less than 5% of $d_{char}$, preferably less than 1% of $d_{char}$.

Characteristic diameter $d_{char}$: The dimension of the conducting means measured in parallel to the direction of the externally imposed electric field. When a number of conducting particles are contacting each other in the direction of the electric field, $d_{char}$ is taken to be the whole length of the resulting conducting structure, measured in the same said direction.

Characteristic radii $a_{char}$: 0.5 times $d_{char}$.

Substrate: The material into which the microchannel or system of channels is produced, including e.g. the silicon wafer into which channels are etched, as well as top-plate constituting the channel roof.

The micropump according to the present invention is designed to transport liquid in the area of a few nanoliter per min. to up to 50 ml per min. The amount of liquid depends on the specific applications, and is typically from several nanoliters (nl)/min for drug delivery, microliters (μl)/min for lab-on-a-chip applications, and several milliliters (ml)/min for cooling applications. For simplicity, the terms micropumps and microchannels will be used throughout the text, even if the prefix "nano" could be used for the lower part of the size range.

Figure 1:
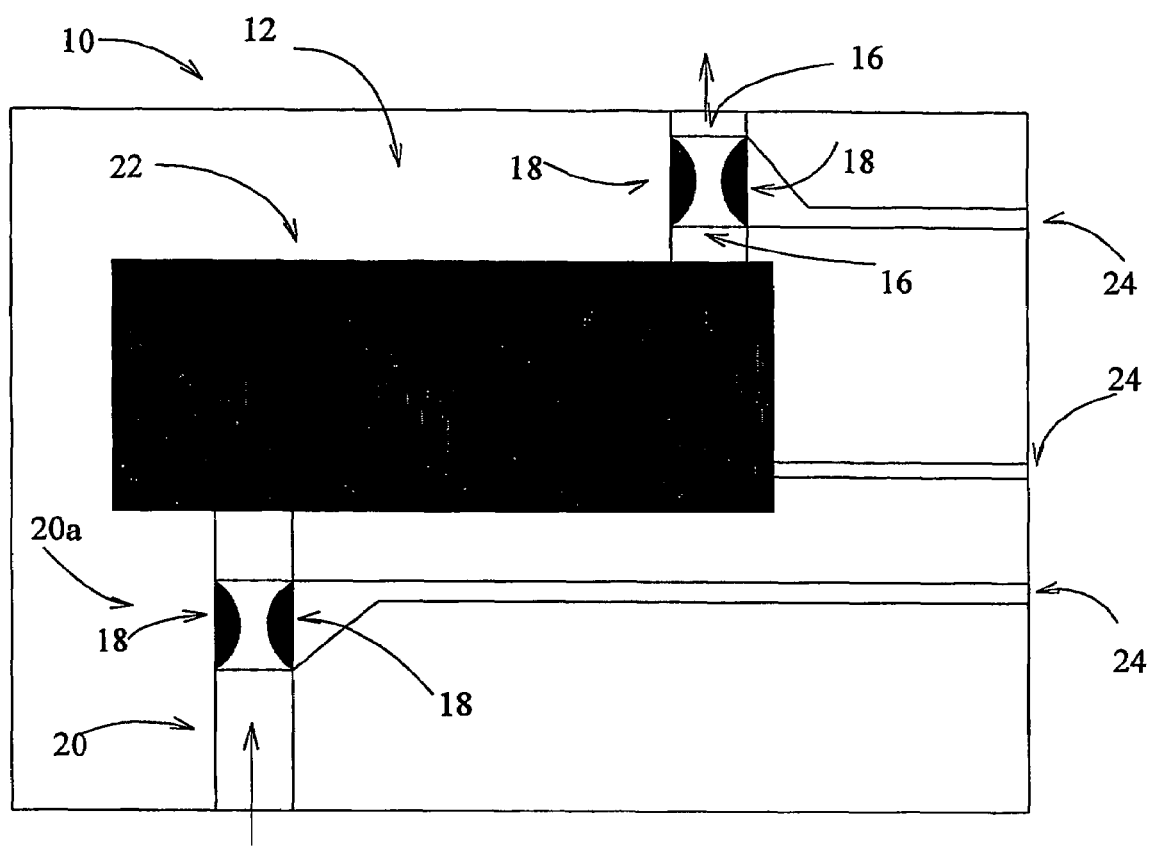
FIG. 1 shows a general schematic outline of a microfluidic system.

FIG. 1 is a general outline of a microfluidic system 10 according to the invention. Preferable, the microfluidic network is arranged on or in a substrate 12. The figure shows two microchannels 20. The arrows indicate the fluid flow direction. The segment 20a is indicated as a portion of the microchannel 20. The electrical connection means (16) establishes an electrical field E in the segment 20a and the conducting means 18 ensures that the liquid is forced in a given direction. Contacts for the electrodes 16 and sensor 22 are indicated with the reference numerical 24. It should be mentioned that the electrodes 16 could be placed anywhere in the microfluidic system, and also outside the systems, e.g. at the channel inlet and outlet. However, the designs with larger distance between electrodes are less prefered. Also, the actuator could be produced e.g. in a capillary instead of being microfabricated onto some substrate.

Figure 2:
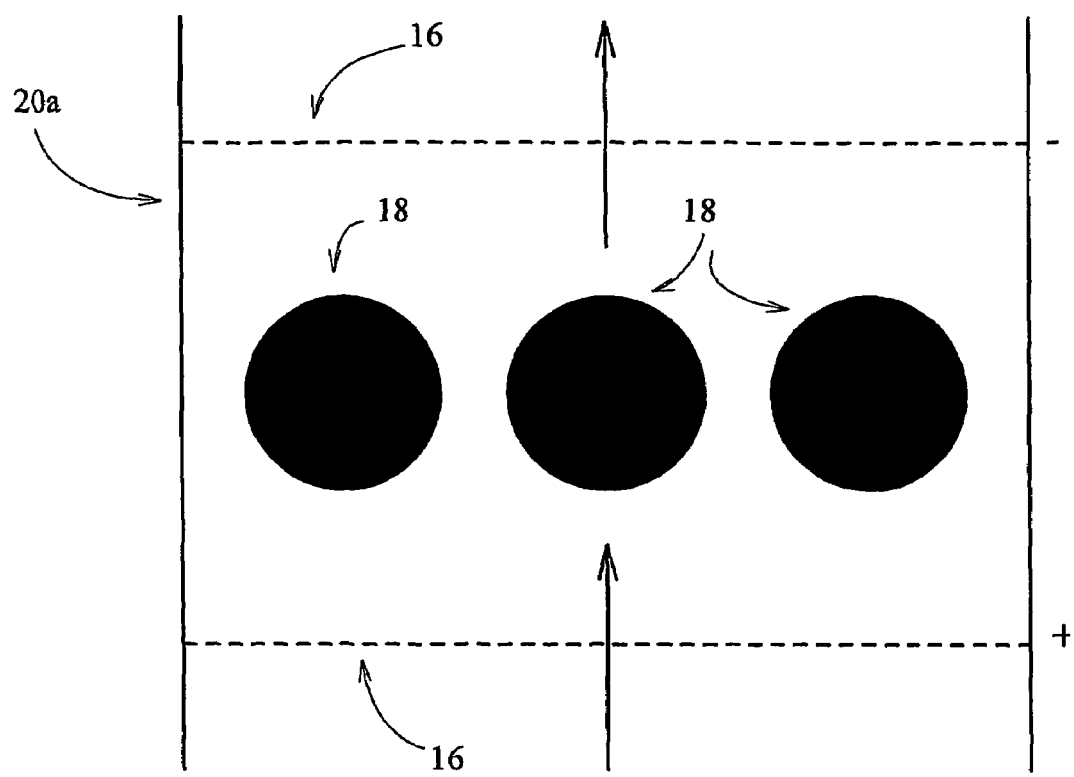
FIG. 2 shows a top view of conducting means consisting of spherical particles.

FIG. 2 shows a top view of an embodiment of the present invention, with circular or spherical conducting means 18, which is fixed to the bottom and top of the channel section 20a. Here, the channel cross-section is rectangular. The distance between particles and between particles and the wall is approximately equal to $a_{char}$, thus both mixing and directed transport will take place. Also indicated on the figure are the walls of the channel 20, and position of electrodes 16 (dotted line). The flow direction is indicated by arrows.

Figure 3:
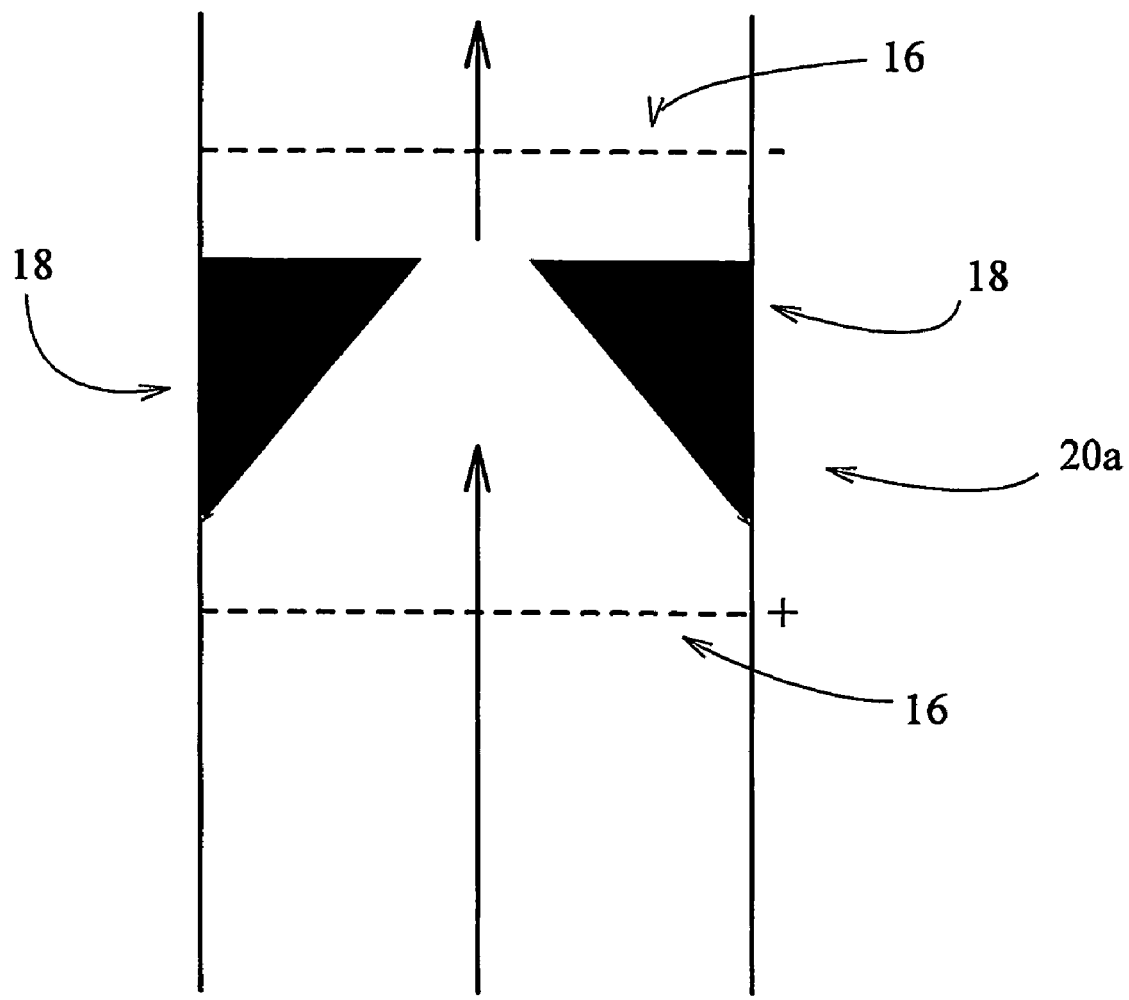
FIG. 3 shows a top view of conducting means consisting inclined planes.

In FIG. 3 is shown an embodiment of the invention with conducting means 18 shaped as two inclined (sloping) planes which are fixed to the channel walls and filling the depth of the channel (with rectangular cross section). Also shown on the figure are walls of the channel 20, position of electrodes 16 and flow direction (indicated by straight arrows). The distance between the conducting means 20 is varying from approx 2-0.5 $a_{char}$, thus If, some mixing will be obtained in addition to directed transport.

Figure 4:
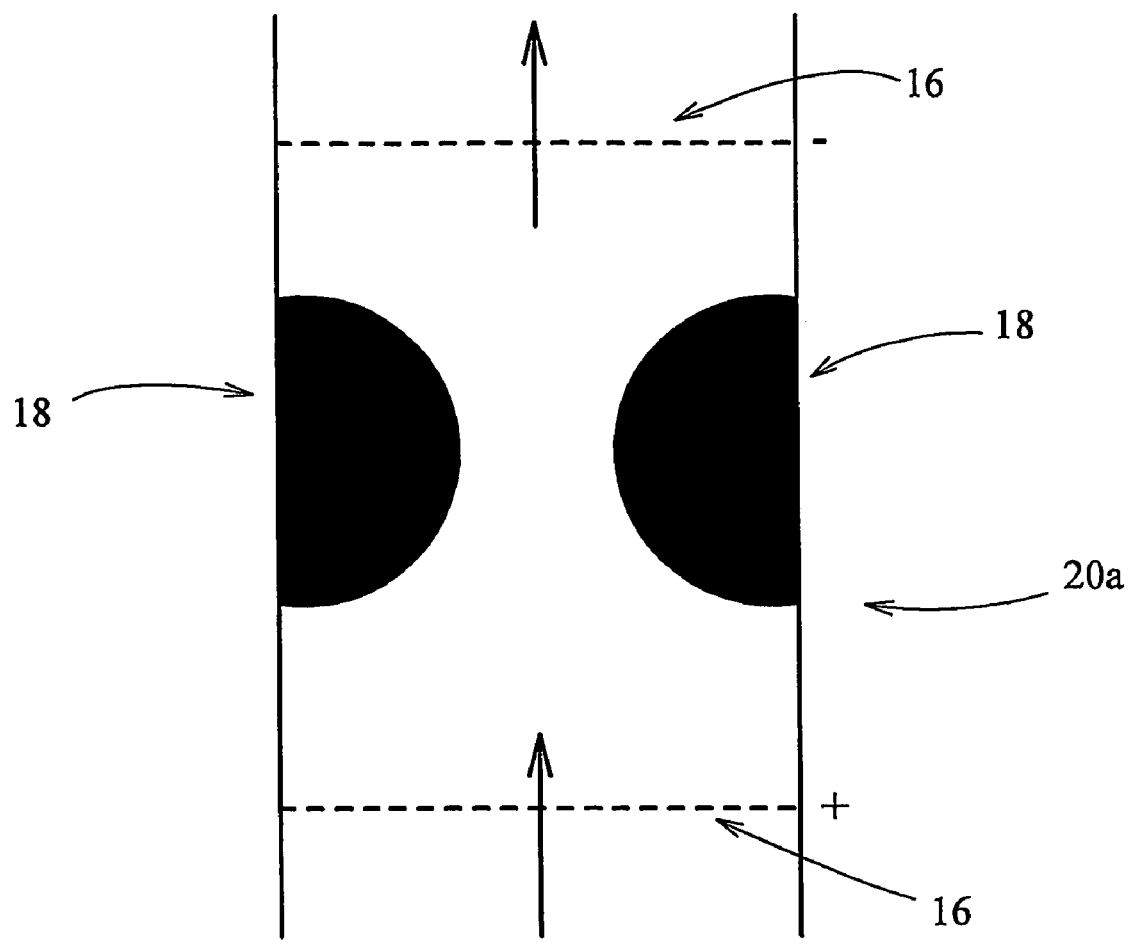
FIG. 4 shows conducting means consisting of semispheres.

FIG. 4 shows an embodiment similar to that shown in FIG. 3, but with conducting means 20 shaped as semicircular cylinders or semispheres. The distance between the conducting means 18 is approximately one characteristic diameter $2a_{char}$, leading to both mixing and directed transport. The positions of electrodes 16 are indicated by dotted lines.

Figure 5:
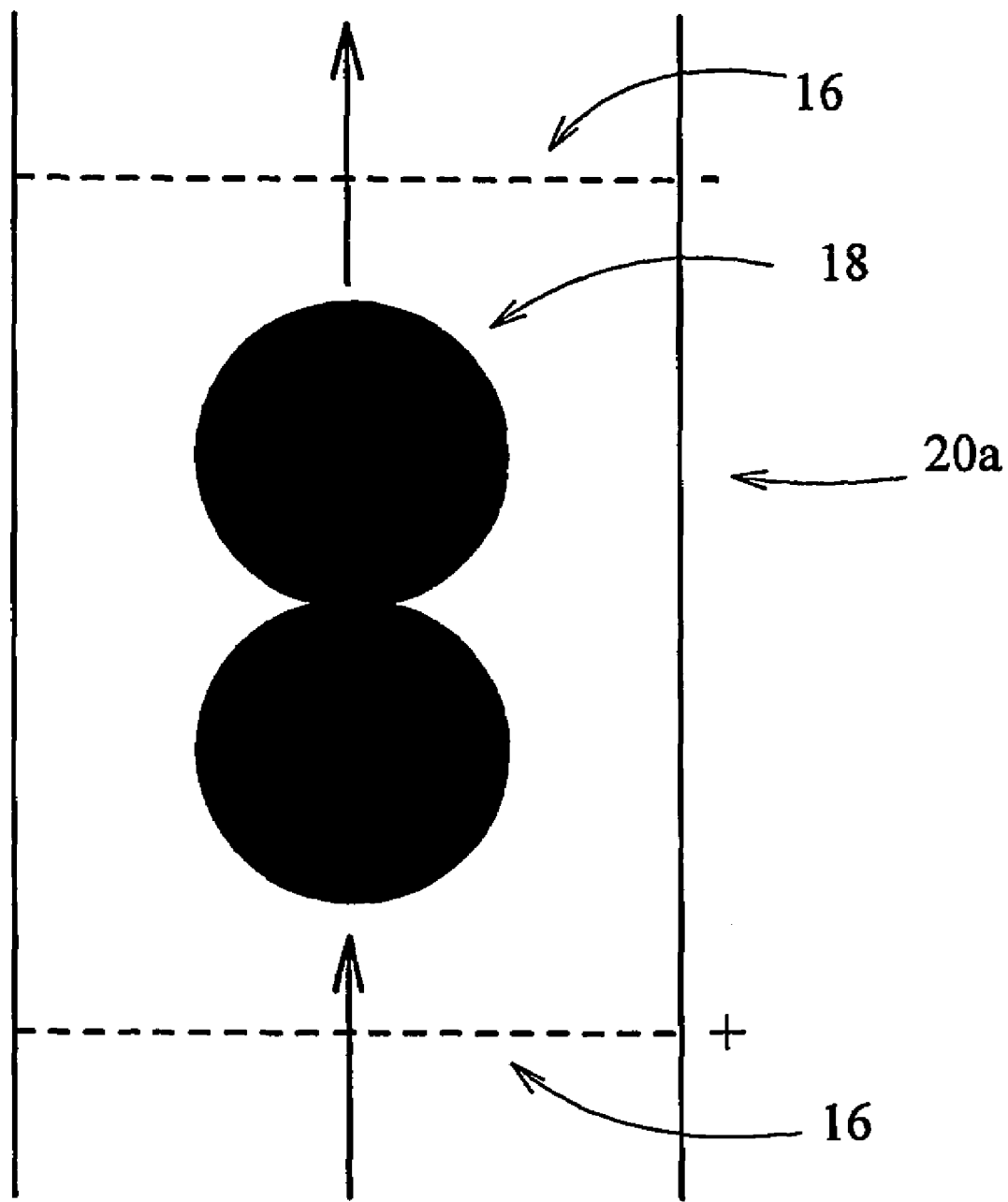
FIG. 5 shows to two layers of particles used as conducting means.

FIG. 5 shows a microactuator with two connected layers of conducting means 18 shaped as circular cylinders or spheres in the flow direction. The conducting means are fixed to the bottom and top of the microchannel 20. The position of electrodes 16 is indicated (dotted line), as well as the direction of flow. As the distance between the conducting means 18 and channel wall is approximately equaling $a_{char}$, both mixing and pumping will be obtained.

Figure 6:
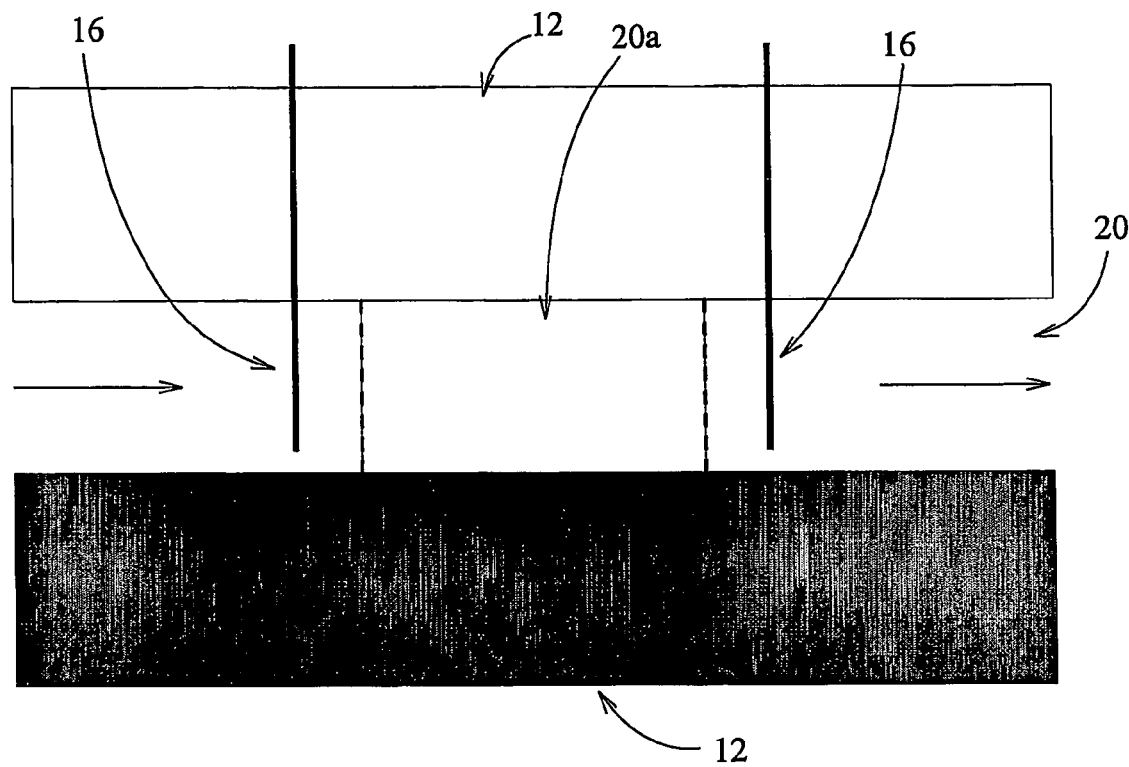
FIG. 6 shows in a side view a part of a microchannel including segment of actuator (conducting means not shown).

FIG. 6 shows a sideview of a microchannel 20 including actuator segment 20a, substrate 12 (e.g. silicon, glass or polymer) and electrodes 16. Also shown is the channel top-plate (chosen among the same materials as the substrate), and flow direction. The segment of conducting means is indicated by dotted lines, but the conducting means 18 is not shown.

Figure 7:
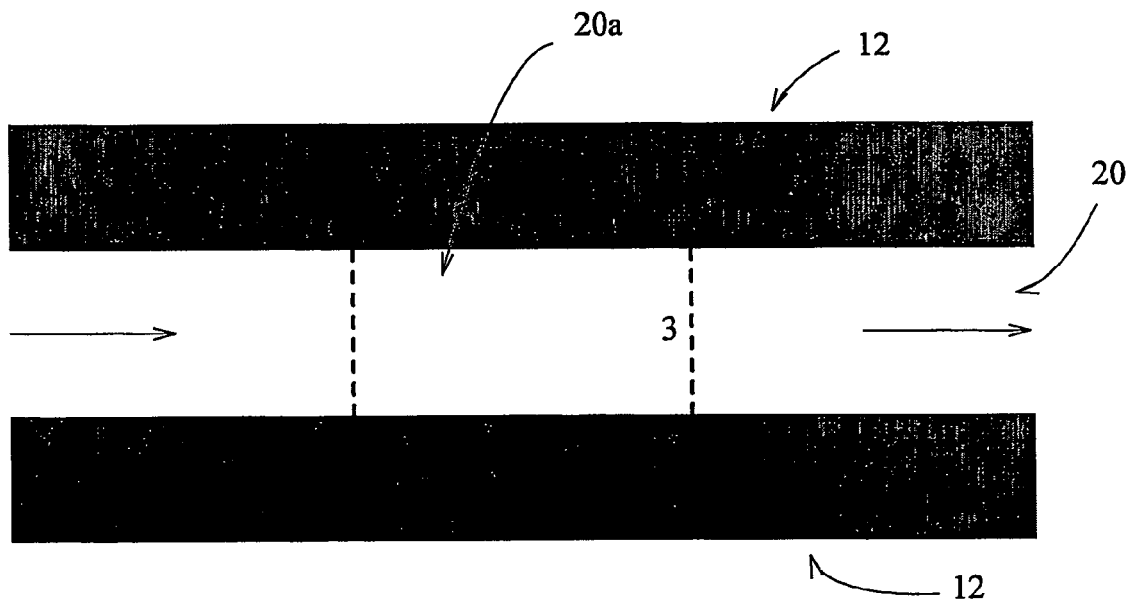
FIG. 7 shows top view of part of microchannel including area of micropump, conducting means not shown.

FIG. 7 shows a top-view of the same structure as shown in FIG. 6.

Figure 8:
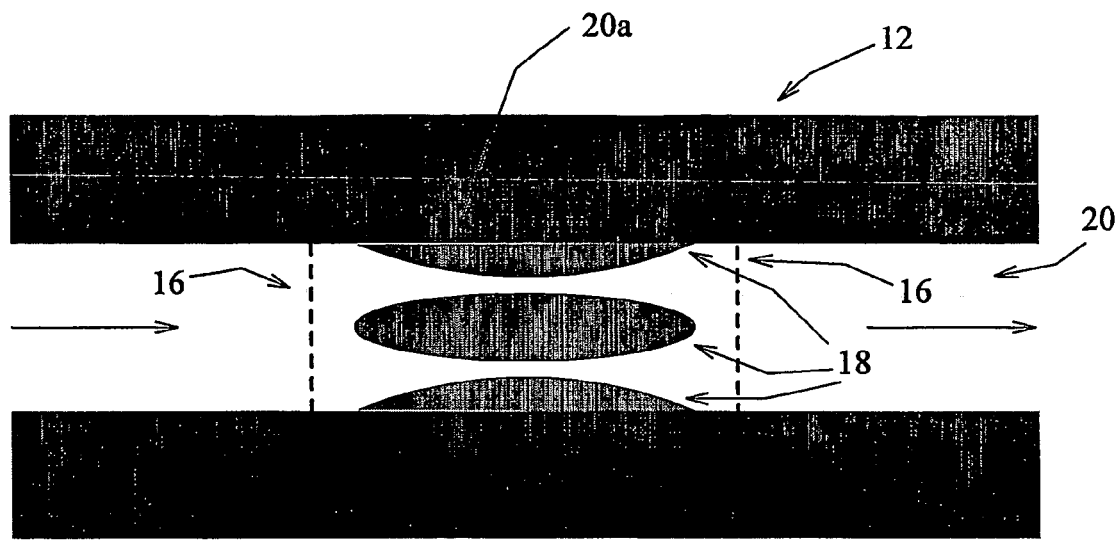
FIGS. 8 and 9 shows top view of part of microchannel including actuator with elliptical conducting particles.

FIG. 8 shows an embodiment of the invention with substrate 12, and ellipsoidal or elliptical cylindrical conducting means 18, which is fixed to the channel bottom and top. Possible positions for electrodes 16 are indicated by dotted lines. As the distance between conducting means 18 is small, mostly directed pumping will be obtained.

Figure 9:
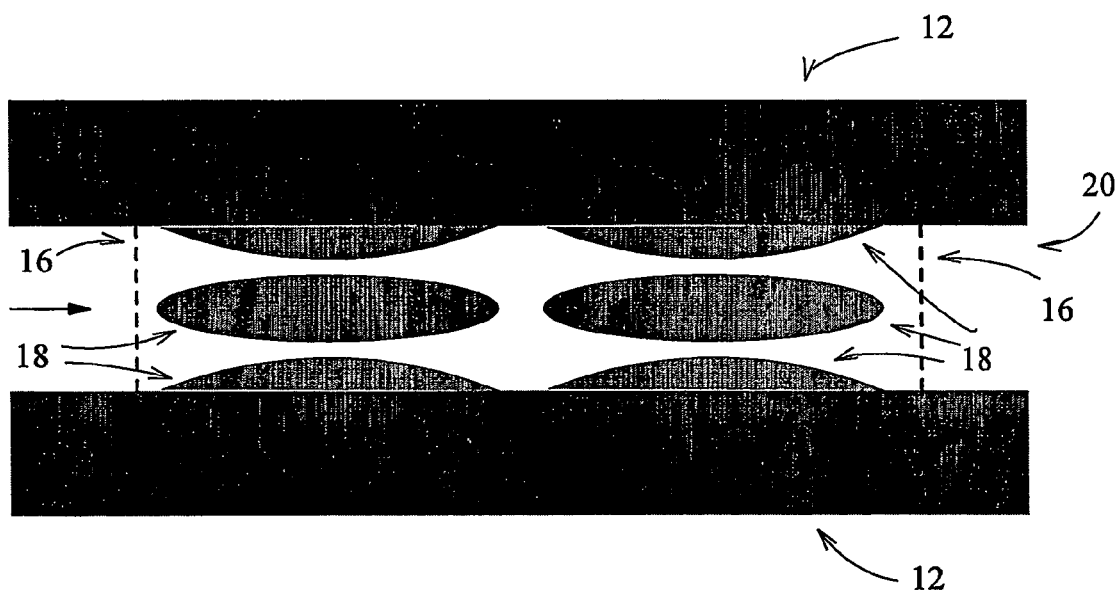

The actuator in FIG. 9 is similar to the one depicted in FIG. 8, but has two layers of conducting means 18 in the flow direction, which are not in contact with each other.

Figure 10:
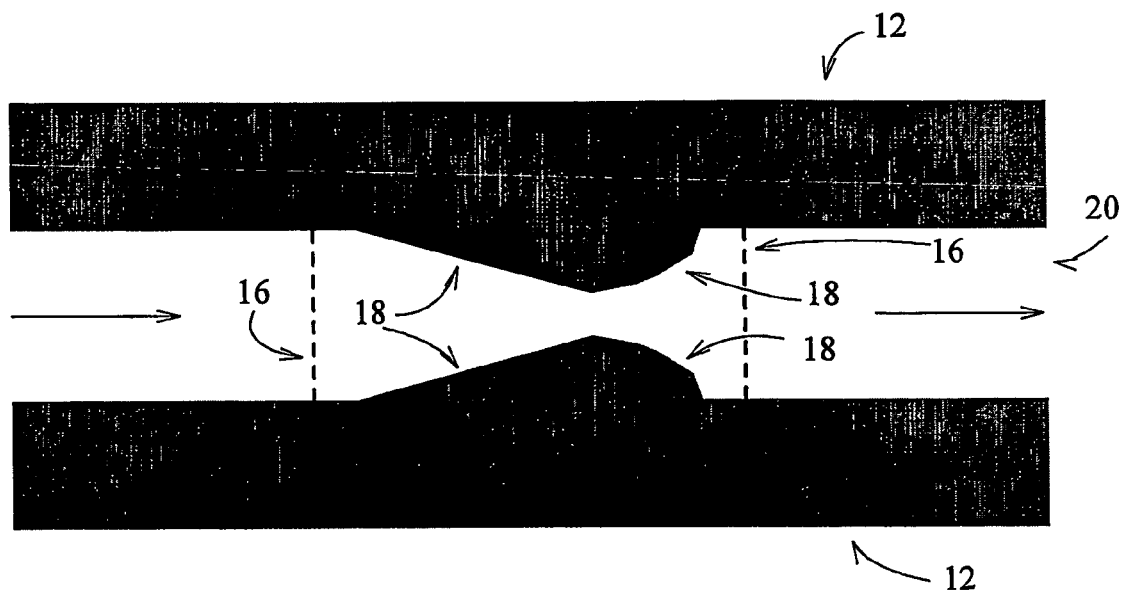
FIGS. 10 and 11 shows top view of part of microchannel including micropump with sloping conducting planes.

FIG. 10 shows a microactuator with two inclined (sloping) conducting means 18, which is fixed to the channel walls and filling the whole channel dept. The distance between the conducting means 18 is relatively small compared to $a_{char}$, thus directed transport will be obtained. Possible electrode positions are indicated by dotted lines.

Figure 11:
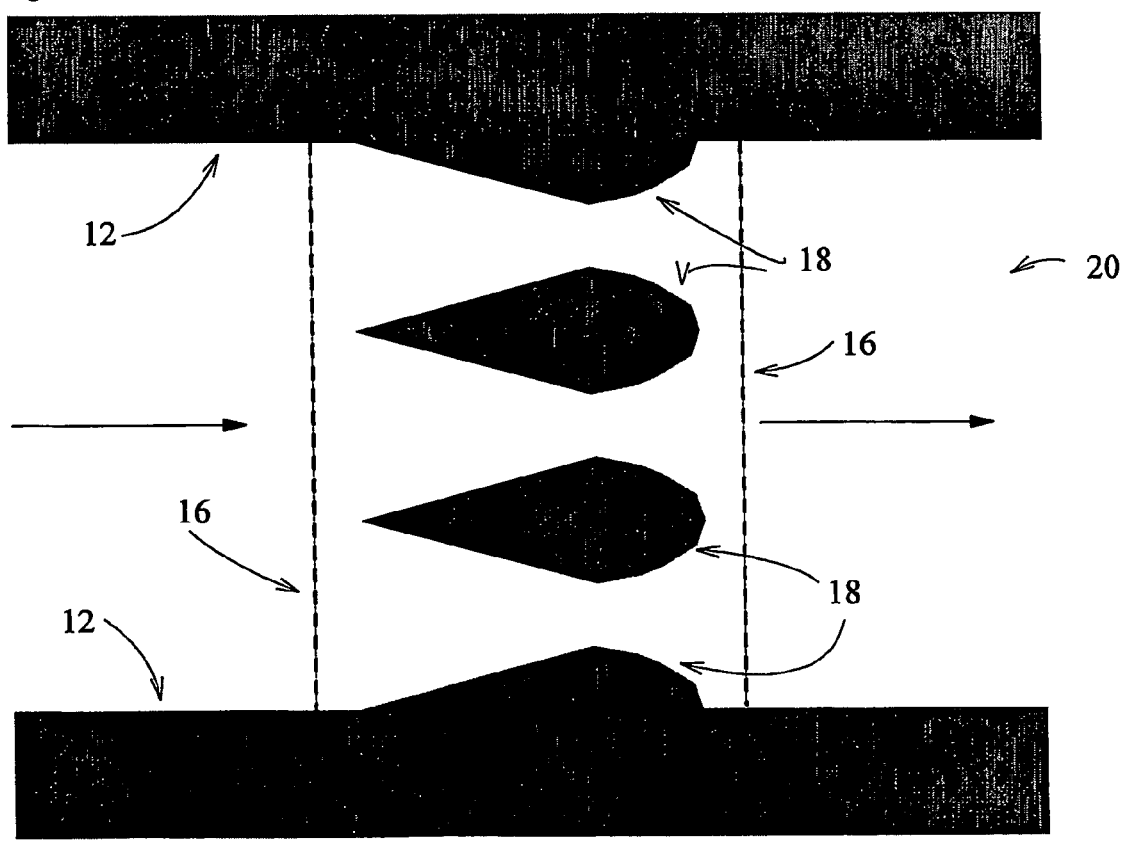

FIG. 11 shows another embodiment with sloping conducting means 18 similar to that shown in FIG. 10, but with additional layers of conducting means in the channel width.

Figure 12:
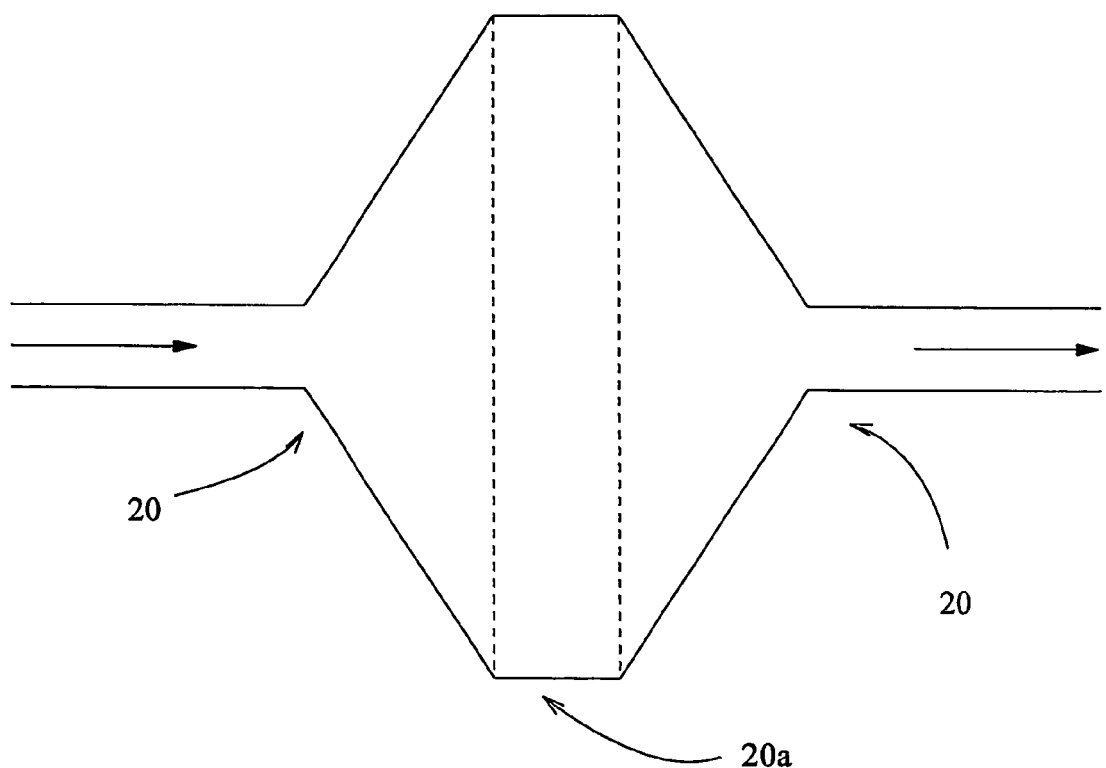
FIG. 12 shows top view of part of microchannel including a widened area for the micropump, conducting means not shown.

FIG. 12 shows a microchannel 20 with a widened channel segment including the channel segment 20a (limited by two dotted lines) containing the conducting means 18. The latter is not shown on the figure. This actuator has the advantage of building up larger pressures.

Figure 13:
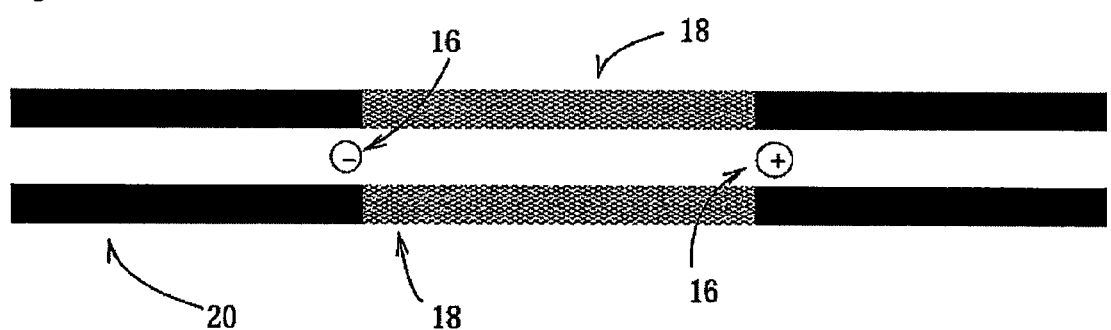
FIG. 13 shows a cross section of microchannel including micropump, where the conducting means is constituting part of the walls.

In FIG. 13 is shown part of the channel 20 including microactuator section 20a, where the conducting means 18 is part of the channel walls. Circular shaped electrodes 16 is also shown. As the distance between the conducting means is small compared to $a_{char}$, significant directed transport will be obtained. Because of the higher conductivities of the conducting wall sections 18 compared to the liquid, the local electric field deviates towards said conducting means 18, creating both normal and tangential field components.

Figure 14:
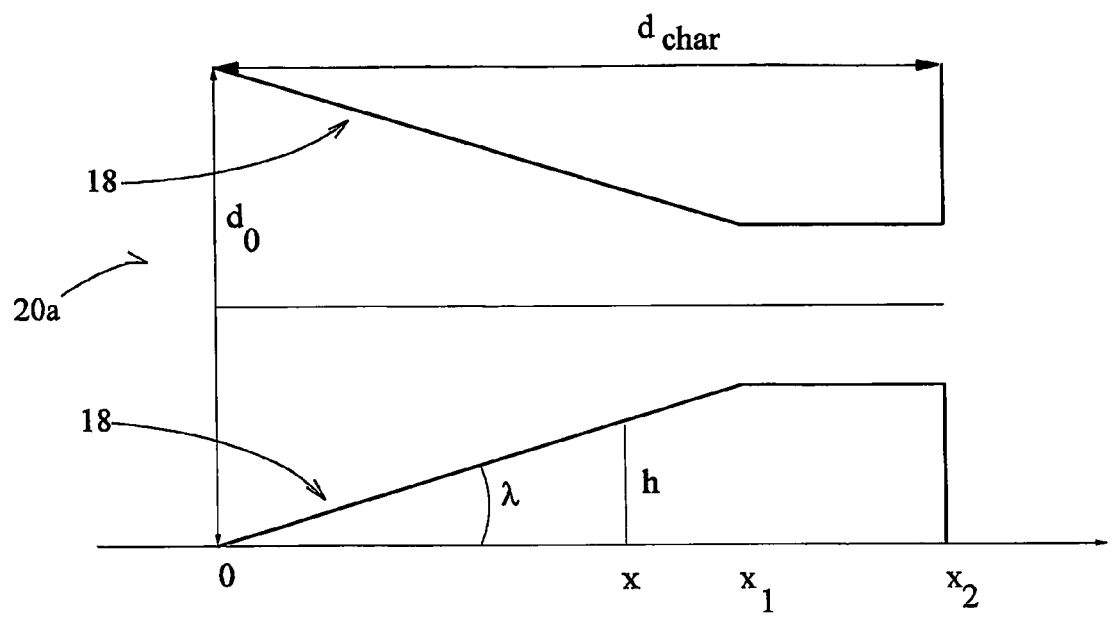
FIG. 14 shows the geometry of a micropump with conducting sloping planes or walls.

In FIG. 14 the geometry of part of the microchannel section 20 including microactuator section 20a and with sloping conducting means 18 is displayed. The angle between channel wall and surface of conducting means λ is indicated, as well as original channel diameter $d_0$, normal distance between original channel wall and a point on the inclined plane h, characteristic diameter $d_{char}$, and channel length axis x.

Figure 15:
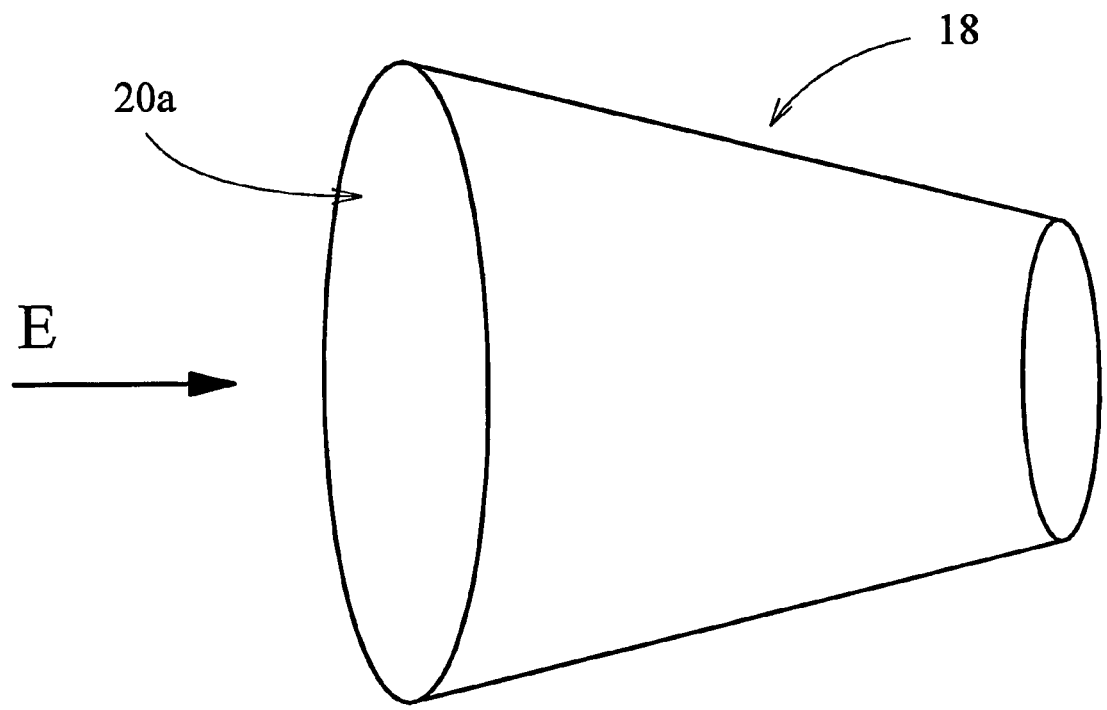
FIG. 15 shows a micropump with conducting sloping walls with circular channel cross section.

FIG. 15 shows the microchannel section 20a with conducting means in an embodiment with sloping conducting means 18 of circular geometry concentric to the rest of the microchannel 20.

Figure 16:
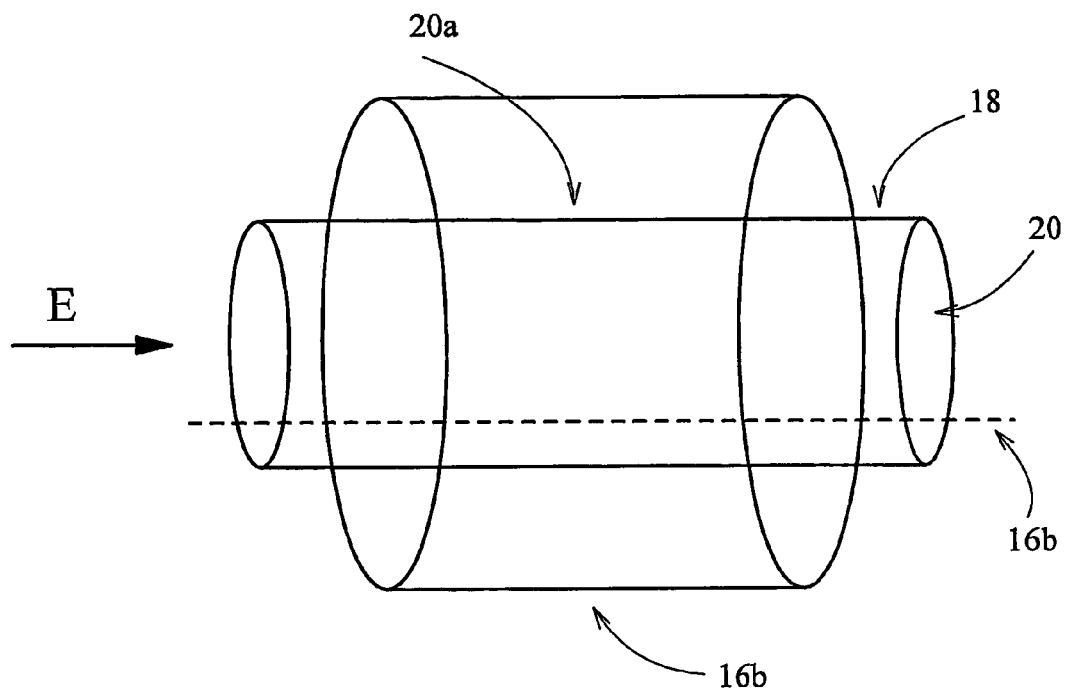
FIG. 16 shows a micropump with four electrodes, consisting of a conducting channel section with one pair of electrodes for inducing the SCR (one is shaped as a wire, the other as a tube concentric to the channel). The other electrodes should be placed up- and downstream the conducting channel section.

In FIG. 16 is shown a microchannel with four electrodes. Here, the conducting means 18 constitutes part of the (cylindrical) channel, while the electrodes 16 placed up and downstream to this section (not shown). The conducting means could be a tubular ion-exchange membrane. A second pair of electrodes 16b induces the electric field normal to the flow, responsible for the SCR build-up. One of these are shaped as a circular tube concentric to the microchannel 20, and with a larger radii. It could consist of metal foil or -deposit, some conducting coating or surface treatment or other. The other electrode inducing the normal field could be a metal wire, which should be kept at some distance from the conducting means 18 by means of pieces of isolation or other fixing method. Preferably, it should be placed along the channel center axis.

Figure 17:
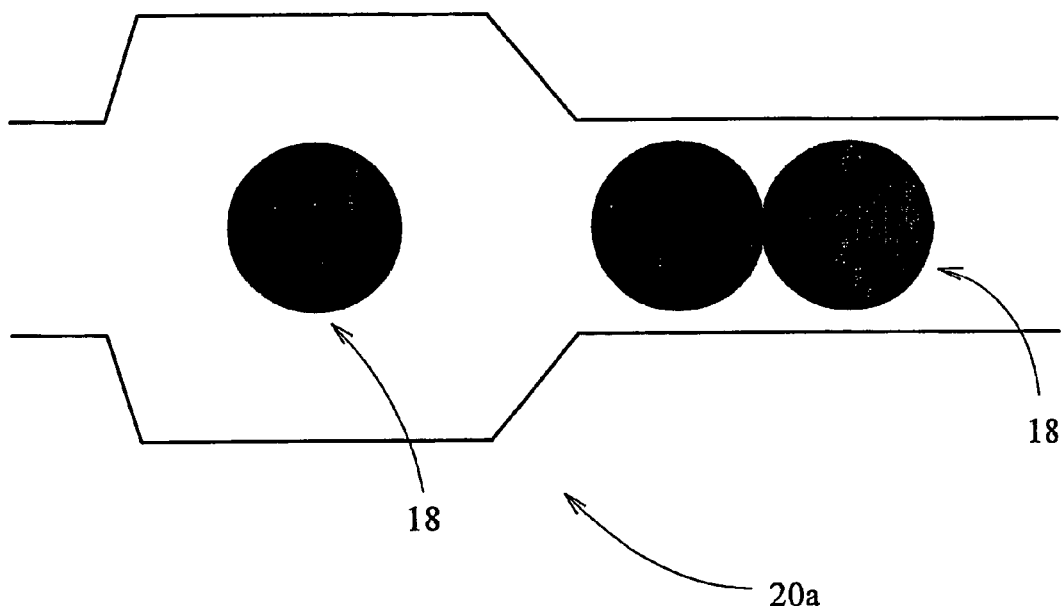
FIG. 17 shows a micropump with the additional advantage of mixing two fluids entering the pump.

FIG. 17 shows a top view of the microchannel section 20a containing the conducting means in which one conducting particle is placed in a widening of the channel 20, keeping the area in a distance up to approximately $2a_{char}$, open for flow, resulting in efficient mixing. The next part of the microchannel section 20a mainly gives directed pumping, as the distance between conducting means and wall is below 0.5 $a_{char}$.

Figure 18:
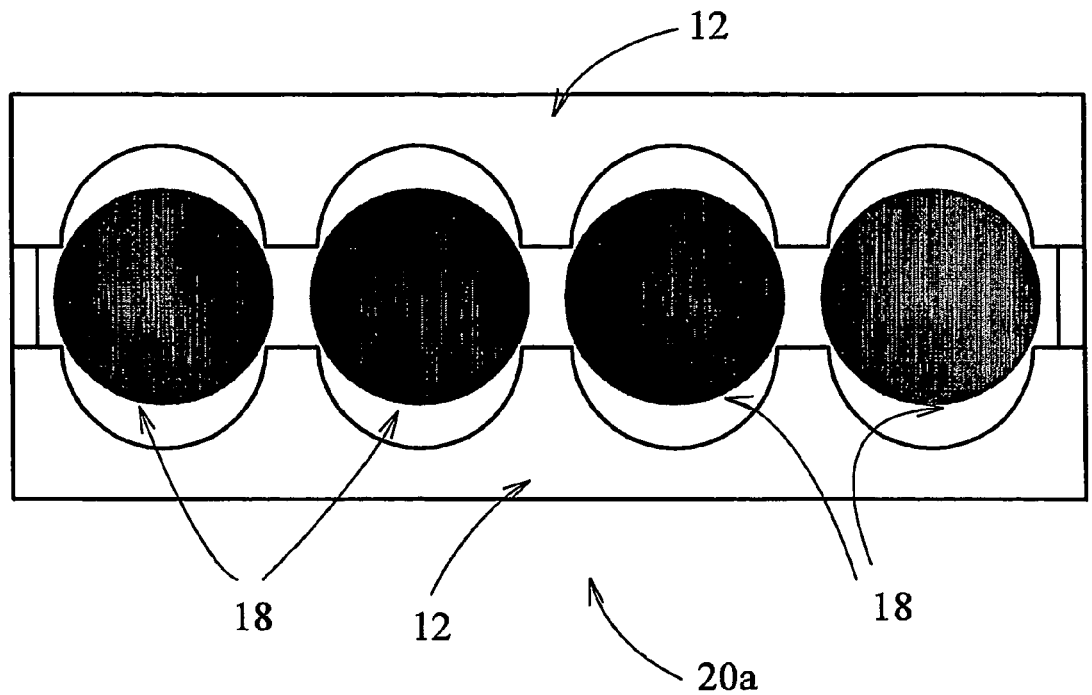
FIG. 18 shows the channel cross-section in an experimental setup, demonstrating flow in microchannels.

In FIG. 18 is displayed a channel cross section in an experimental setup, where conducting means 18 are fixed between two plates with microfabricated semicircular holes. The microchannel length direction is directed normally to the paper plane, and the channel side-walls are produced by sealing the plates by a sealing mass on each side. Spherical sulphonated styrene-divinylbenzene ion-exchange particles were used as conducting means 18.

Figure 19:
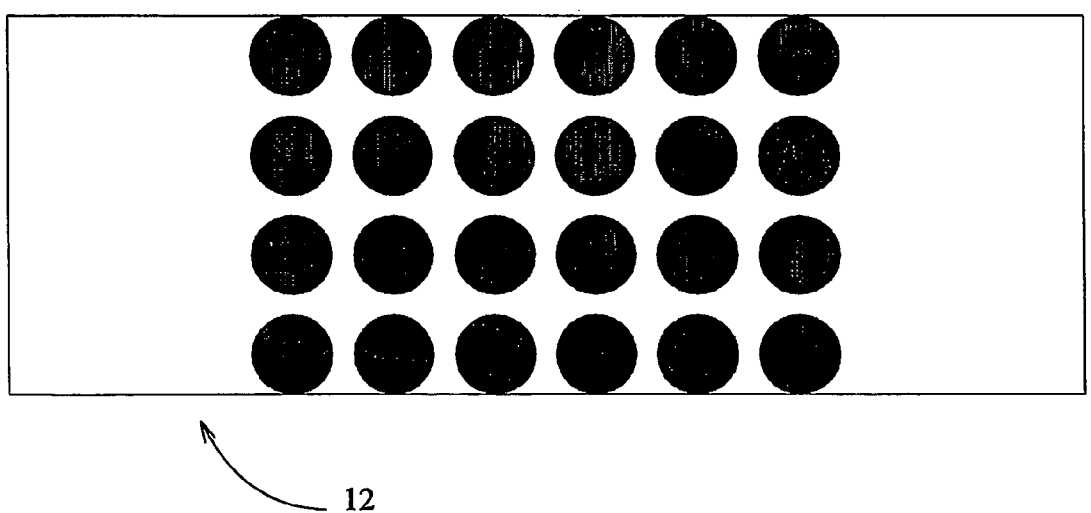
FIG. 19 shows the hole-plate used for making the experimental microchannel.

FIG. 19 shows a top view of a microfabricated hole plate used for the experimental setup in FIG. 18.

Figure 20:
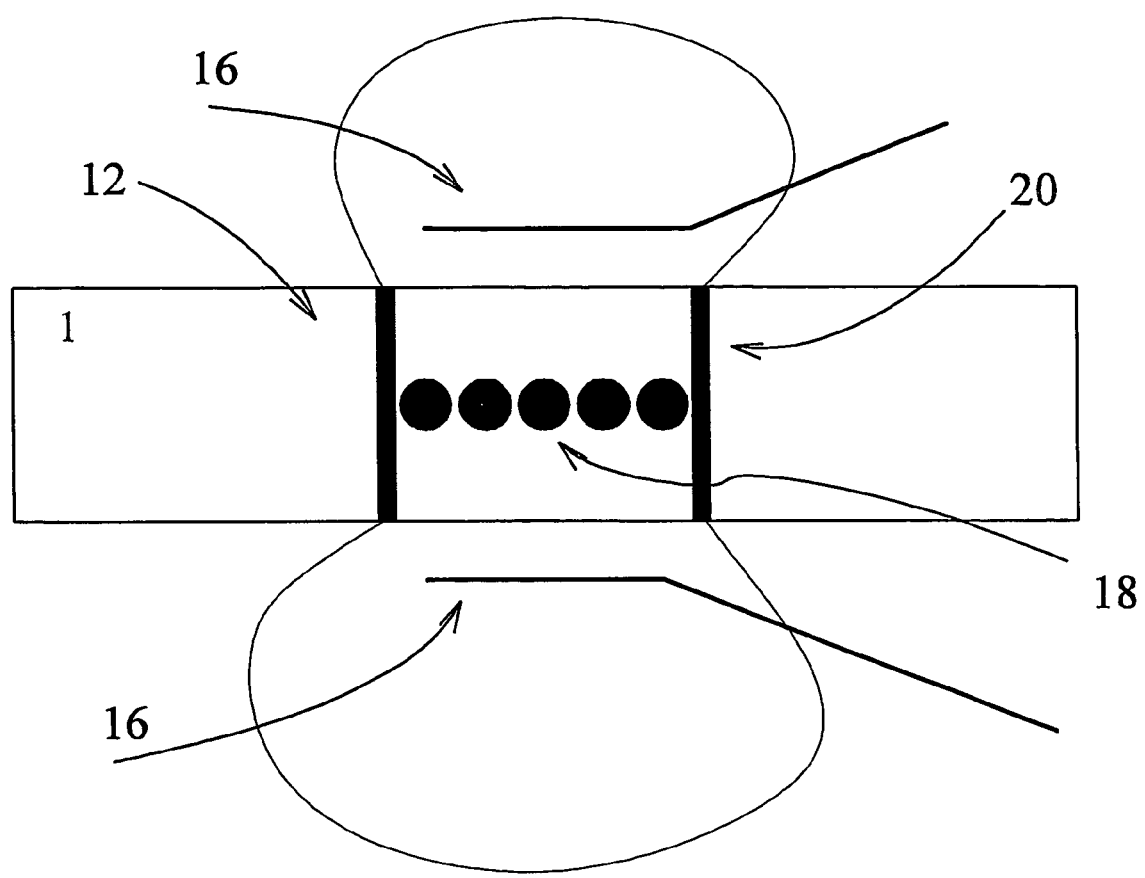
FIG. 20 shows a top view of the experimental setup, with liquid filled areas indicated.
Figure 21:
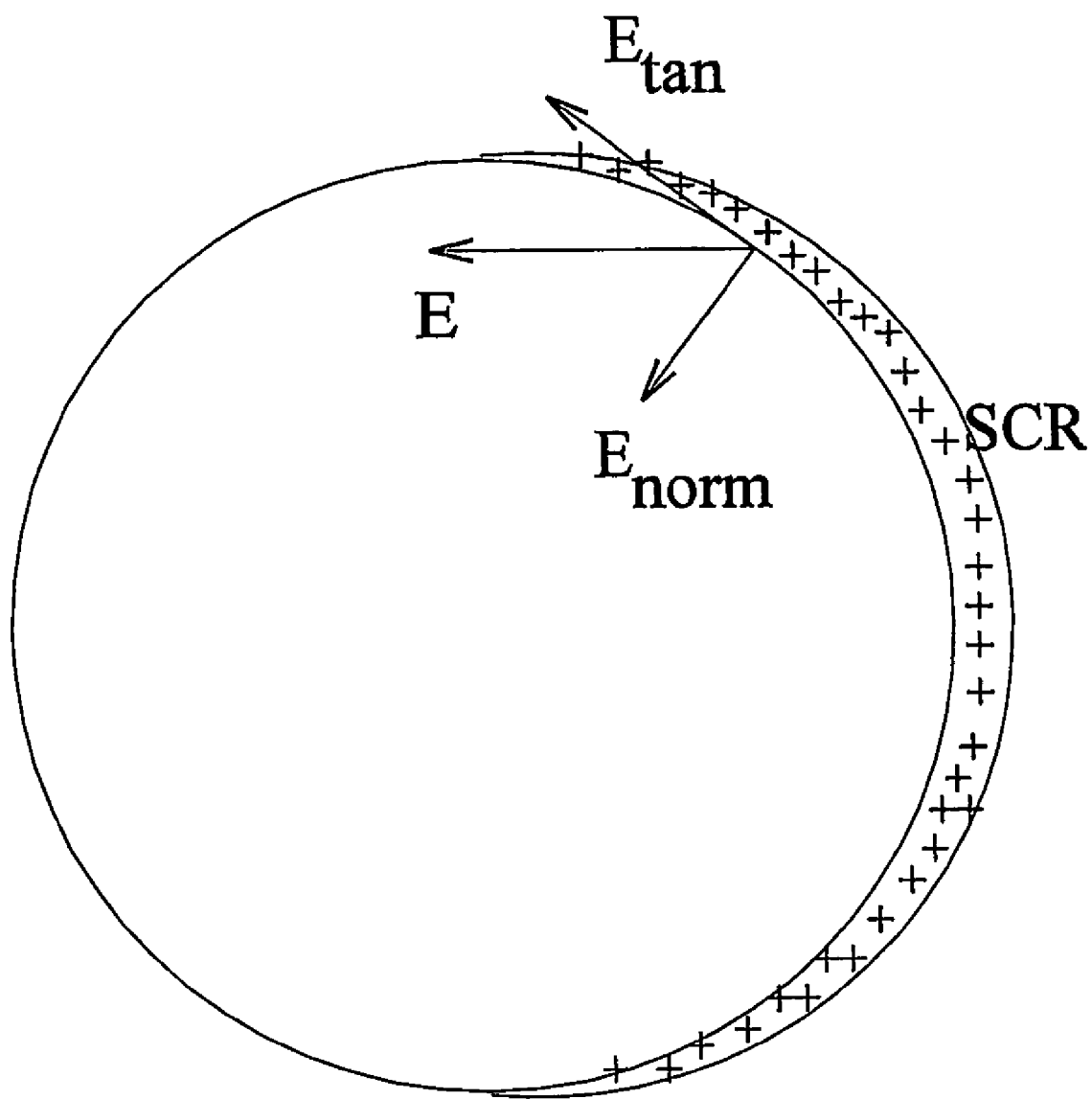
FIG. 21 shows the principle of EO2 on a single conducting particle in some liquid of lower conductivity, and in a strong (according to equation 3) electric field, where the normal field component induces the SCR, while the tangential component results in ion and liquid transport.

FIG. 20 shows a top view of the experimental setup, including conducting means 19, electrodes 16 and two liquid reservoirs on each side of the microchannel 20.

Generally, the conducting means 18 could have shape of ellipsoids, circular or elliptical cylinders, of spheres, semispheres, or any shape with a circular cross section. Further, it could have the shape of planes having an angle between 0-85 degrees with the applied electric field, preferably with an angle within 30-60 degrees. The conducting means should have a conductivity of at least 5 times that of the liquid to be actuated, preferably at least 10 times this conductivity.

The characteristic dimension of the conducting means (18) $d_{char}$ should be within 0.1 μm and 5 mm, but for most applications between 10 μm and 500 μm.

For applications where predominantly directed EO2 pumping is desired, the space between the conducting particles 18, and between the conducting particles 18 and the channel walls 20a, should be between ⅛ and ½ $a_{char}$. The distance to the wall does not apply where the conducting means 18 is attached to the walls, as in FIG. 3, 4 and 10, 11. For one layer of particles in the flow direction, this distance could be smaller or zero. If there is more than one layer, there must be space between the particles in each layer, or between the particles in adjacent layers, or both.

If mixing should also be obtained, the distances could be up to 2 $a_{char}$. For the largest distances, mixing is predominantly obtained.

FIG. 13 shows an embodiment where the conducting means 18 is part of the microchannel wall 20. This is a special aspect of the invention and the EO2 condition is established by a declining in the local electrical field near the conducting means 18.

The length of the conducting areas should be the same as for conducting particles. The channel geometry could be rectangular, circular or elliptical. Here, $d_{char}$ is the length of the conducting field, measuring in the flow direction. By analogy to the conducting particles, the distance between two opposite conducting walls should preferably be ⅛-½ $a_{char}$ for obtaining directed flow. The conducting area could cover part of the channel circumference (e.g. the walls), or the entire channel circumference.

For the structure with conducting walls depicted in FIG. 13, the electrodes 16 could preferably be placed at some distance from the portion 20b of the channel walls, and occupying ⅓ of the channel width or less. They could be placed closer to the electrodes 16 than described above, and they could even be placed within the area 20b of conducting walls. Also, this structure could be extended by using several rectangular blocks of conducting means in the width of the channel. In such geometry, the ends of conducting blocks could be electrically isolated, in order to increase the tangential electric field component.

For the structures containing one pair of electrodes 16, the electrodes should be placed up- and downstream in relation to the conducting area, respectively. These could be electronically conducting areas deposited into or onto part of or the whole circumference of the channel walls 20b, or they could be grids or other (preferably microfabricated) structures in the channels. They could be connected to the power source (not shown in the figures) by microfabricated conductors. Also, the electrodes 16 could simply consist of metal wires inserted from the outside through the channel walls 20b. The electrodes 16 should be placed some distance from the conducting means 18, in order to obtain a straight electric field, but not too large distance in order to avoid high electric potentials. Typically, the distance between each electrode and the conducting means 18 should be between 0.5 and 5 mm. However, the distance could be smaller or larger.

A four electrode micropump is illustrated in FIG. 16. Here, a conducting, circular channel section of length $d_{char}$ is encapsulated by a concentric conductor constituting one of the electrodes responsible for inducing the SCR. The other electrode for this purpose, is put into the conducting channel, and could be a metal wire with pieces of isolation for avoiding electrical contact to the channel walls. Ideally, it should be fixed in the channel center by means of isolation structures allowing for liquid flow. The other pair of electrodes should be place up- and downstream with respect to the pumping area, as described above.

A micropump capable of mixing two or more liquids can be produced by holding a larger part of the area around the conducting means open (not occupied by other conducting particles or walls). As this could lead to mostly or exclusively circular flows, the pump should also contain a chamber with open spaces optimized for directed flow (⅛-½ $a_{char}$) Such a mixing pump is shown in FIG. 17. The mixing chamber 24 could contain several conducting particles 18, and its size can be determined based on the desired mixing time.

In the following, the underlying mechanism will mainly be described with reference to conducting means in the form of a spherical particle. However, the extension to other geometries is straightforward, as the description in terms of $d_{char}=2a_{char}$, can be used for all shapes.

The underlying concept of the invention is that the tangential electric field component works on the SCR induced by the normal component. The solvated ions in the SCR are then transported similarly to the ions in the EDL for classical EO. In both cases, the bulk pore liquid is set in motion due to viscous forces.

The EO1 velocity is given by the Smoluchowsky equation, $$v^{EO1} = \frac{\varepsilon \zeta E_{\parallel}}{\eta} \qquad \text{Equation 1}$$

Here, $\varepsilon$ is the liquid permittivity, $\zeta$ the surface (zeta) potential of the wall, $E_{\parallel}$ the electric field strength parallel to the charged surface, and $\eta$ the liquid viscosity. For EO2, the velocity is given by the formula $$v^{EO2} = \frac{2\varepsilon a_{char} E_{\parallel} E_{\perp}}{\eta} \qquad \text{Equation 2}$$

$E_{\perp}$ being the normal electric field component.

In the case of other shapes of the conducting particle, $d_{char}$ is taken to be the dimension measured in the flow direction. The SCR charge is approximately equal to $d_{char}$ times E.

Classical electroosmosis (EO1) is caused by transport of permanent charges (ions) in the EDL. These ions are hydrolyzed (i.e. a number of water molecules are associated to each ion) or in general solvated (other solvent than water may be used). When the electric field sets the charges in motion, water is also transported While this effect is taking place in a thin charged zone, the whole pore-liquid is set in motion by viscous forces. The water transport is proportional to the EDL (or zeta-) potential and E.

It is important that the SCR is established independently of the presence of any EDL on the surface. The notion of "electroosmosis of the second kind" indicates the similarity to EO1 by having its source in a thin charged zone, which is different from electric effects working on the bulk liquid (the latter is termed electrohydrodynamic effects).

An SCR is induced on the conducting surface if the field is strong enough to give a strong concentration polarization. The polarization zone then consists of a diffusion zone at the boundary with the bulk liquid, the SCR layer closer to the conducting surface, and possibly an EDL closest to the surface. Such polarization phenomena have been described for both ionically and electronically conducting materials.

The polarization phenomenon can be described most simply with reference to a permselective (cat)ion conducting material in some liquid of lower conductivity. This phenomenon is well known, and will be described briefly here. By directing an electric field towards the membrane, cations are transported towards and through the solid material, while no anions are allowed to pass in the opposite direction, due to permselectivity. At steady state, the electrodiffusional flux of co-ions away from the membrane is compensated by a diffusional flux in the opposite direction. Thus, a diffusion zone with concentration decreasing towards the membrane is observed. Upon increasing the electric field strength, the current increases while the concentration decrease becomes larger. A limit is reached at zero ion concentration near the membrane. At this point, no current increase is observed upon further increasing the voltage, thus the term "limiting current".

However, while the limiting current represents a plateau in the voltage-current curve, a further increase in current takes place if the voltage is high enough. One feature of this strong concentration polarization, is the appearance of the SCR close to the membrane (between the membrane and the diffusion zone).

One reason for the appearance of over limiting current is the appearance of EO2 eddies (circular flows, sometimes referred to as electroconvection) in the polarization zone, adding to the diffusional ion transport. Even at a flat membrane, EO2 eddies are observed.

In electromembrane processes, a high current at lowest possible voltage is desired, as this gives a more energy efficient process. Thus, it has been an object of some studies to increase the EO2 convection in electrodialysis by special membrane and stack design (see examples below).

The conditions for obtaining EO2 can be summarized:

1. A conducting media with both tangential and normal electric field components to its surface is surrounded by a liquid of lower conductivity. The presence of both tangential and normal field components can be obtained in the following ways:
   a) The conducting material has a circular (spherical or cylindrical) or sloping structure, thus both components appears in an electric field simply introduced by two electrodes (which may be shaped as two parallel planes or lines on the channel walls).
   b) Again using two electrodes, the pump can consist of a cylindrical pore channel with conducting walls. With system geometry as described in this text, the local electric field will deviate towards the pore walls, resulting in both tangential and normal components to the walls. This is illustrated in FIG. 13.
   c) By the use of four electrodes, two for inducing the SCR, and two for setting the ions in motion. This is shown in FIG. 16.
2. A (normal) potential drop which is large enough for inducing the SCR. This means that the dimensionless potential drop across one characteristic particle diameter is larger than unity, which translates into:

$$E > 0.013 V/a_{char} \qquad \text{Equation 3}$$

3. The tangential field component must not be too large, otherwise the SCR are depleted of ions, and the SCR becomes thinner. Thus, the electric potential should not exceede:

$$E_{max\_SCR\_flux} = \left(\frac{3}{2}\right)^{\frac{4}{5}} \frac{RT}{F} m^{-\frac{2}{5}} \kappa^{\frac{4}{5}} a_{char}^{-\frac{1}{5}} \qquad \text{Equation 4}$$

Here, R is the gas constant, T the temperature, F Faraday's constant, m a dimensionless constant equaling 0.2 for aqueous solutions, and κ the inverse Debye-length.

4. The conducting media could be conducting by means of ions, electrons or holes; and it could be a conductor or semi-conductor. It should preferably be non-porous, but could also be porous, although this would lead to a reduced velocity. The best results are obtained for a permselective ion-conductor.
5. In order to avoid water splitting the concentration in the SCR should exceed the ion-product of water. As EO2 convection is counteracting the lowering of concentration resulting from polarization, a lower electric field strength above which no water splitting is present is observed:

$$E_{min\_ws} = \frac{3}{8\sqrt{2}} m^{-1} \left(\frac{k_w}{c}\right)^3 \frac{RT}{F} \kappa^2 a_{char} \qquad \text{Equation 5}$$

where $k_w = 10^{-7}$ M is the dissociation product of water, and c the liquid ion concentration.

In addition comes the condition of thin SCR, which is fundamental in the theory of EO2.

This is given by the expression:

$$E_{max\_thin\_SCR} = \frac{2}{9} \frac{RT}{F} \sqrt{m} \kappa^2 a_{char} \qquad \text{Equation 6}$$

From these conditions, an interval of electric field strengths for which EO2 will appear, can be calculated for a certain system. This interval depends upon ion concentration and particle size among other things, as can be seen from equations 3-6. The calculated critical field strengths are plotted in FIG. 24 to 27.

Figure 23:
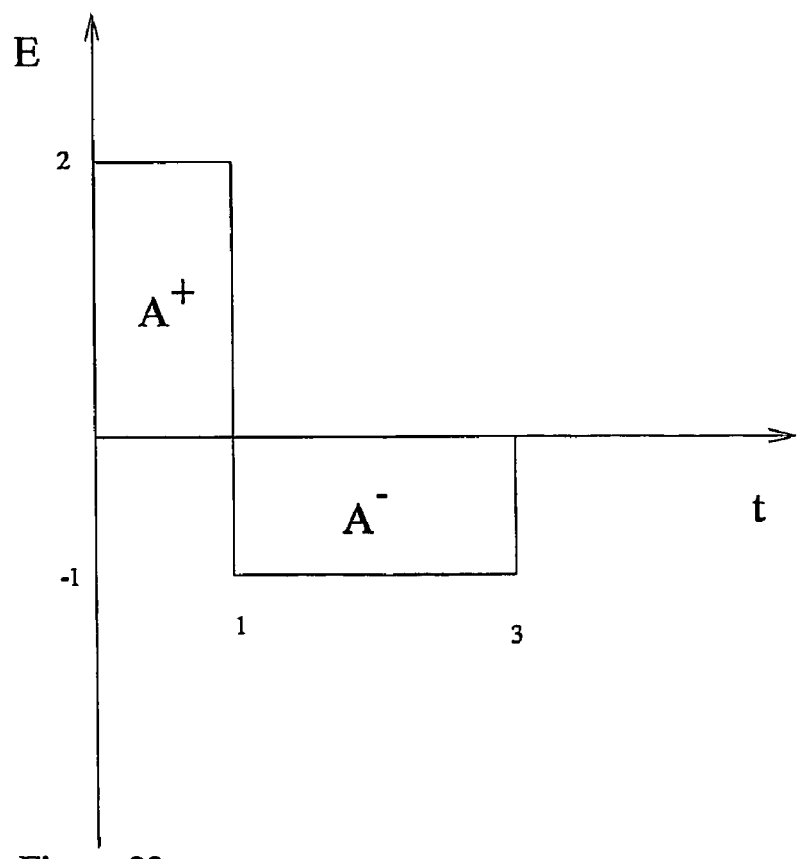
FIG. 23 shows the electric signal with no DC component according to the invention.
Figure 24:
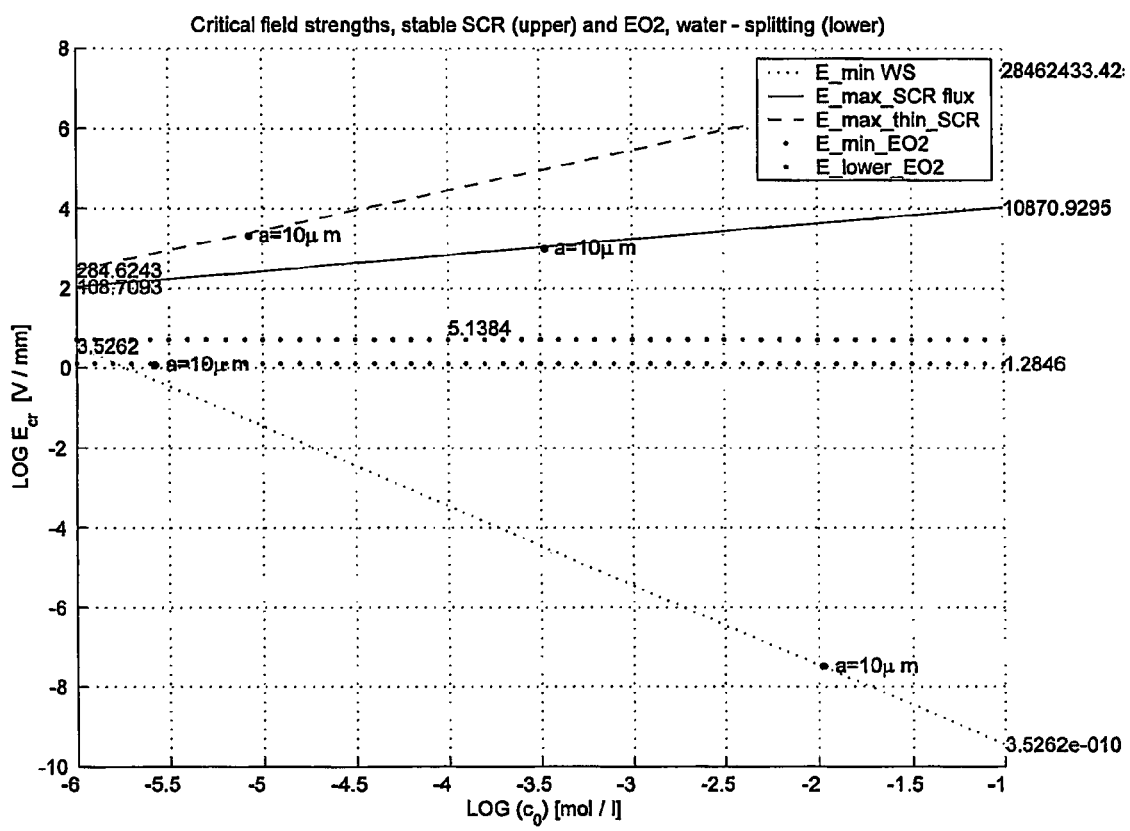
Figure 25:
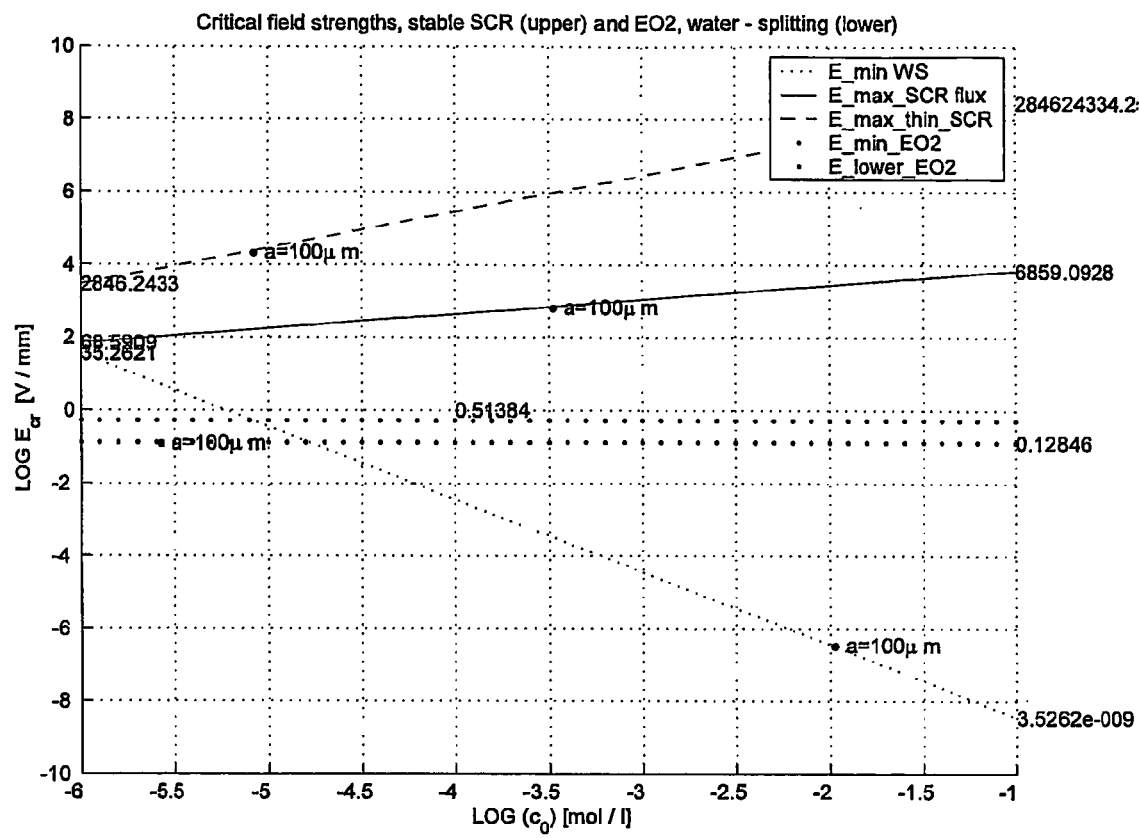
Figure 26:
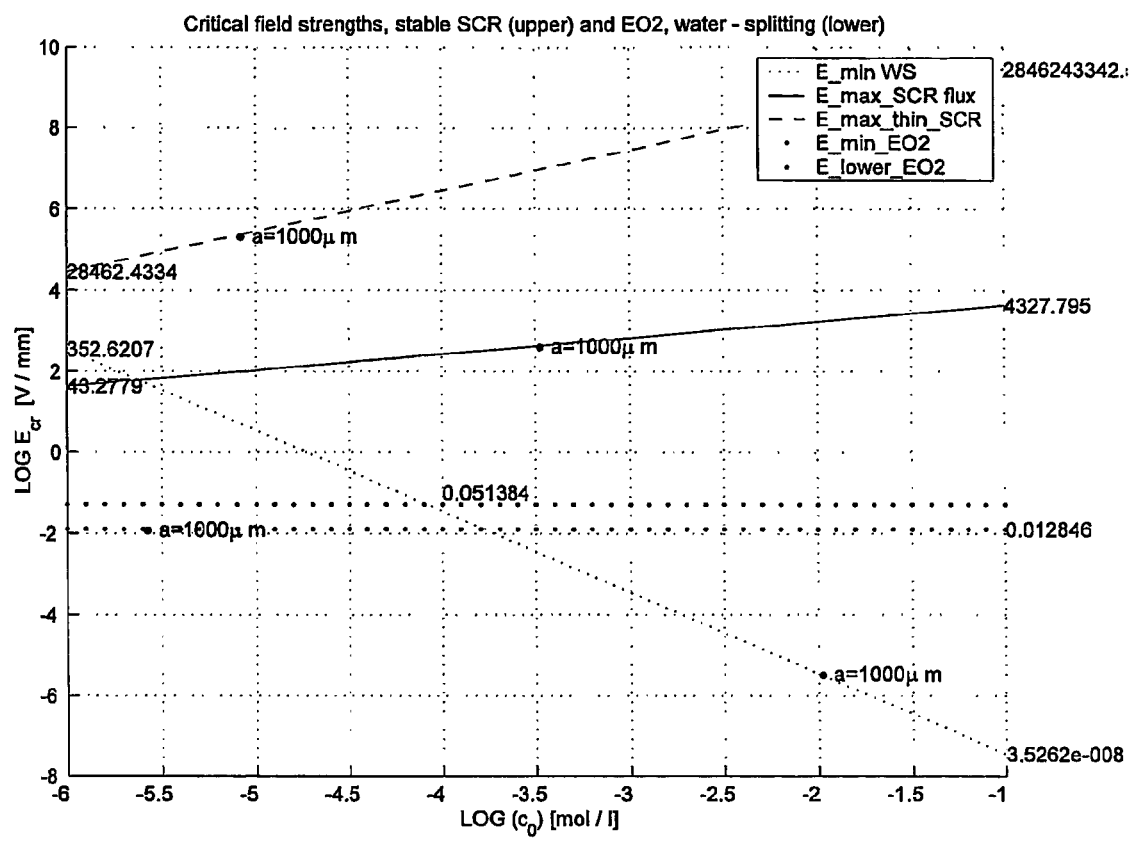
Figure 27:
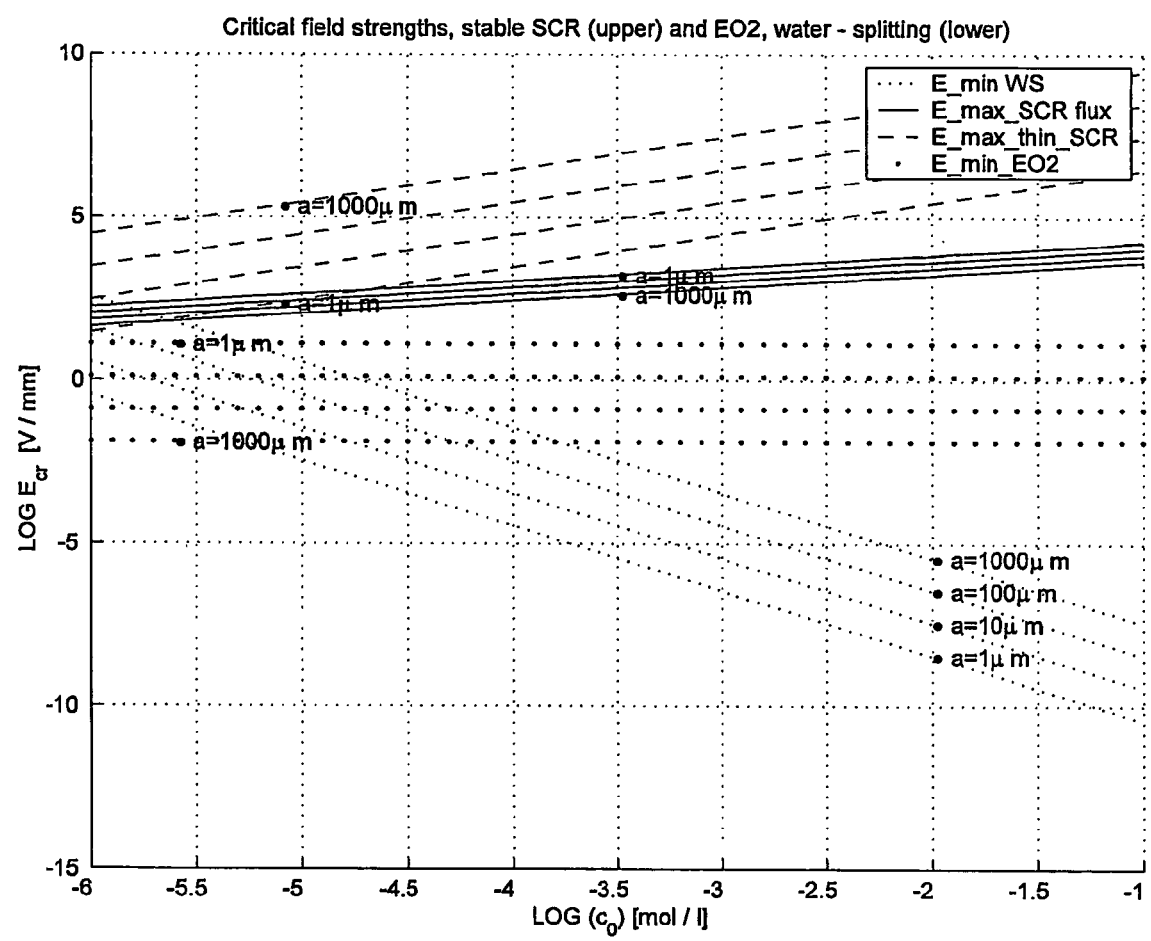

As a result of the dependencies upon both the normal and tangential field components, the liquid velocity is non linear in the electric field strength. For this reason an alternating field can be applied (illustrated in FIG. 23), contrary to for EO1. For EO2, the velocity is approximately proportional to the square of the field strength.

Figure 22:
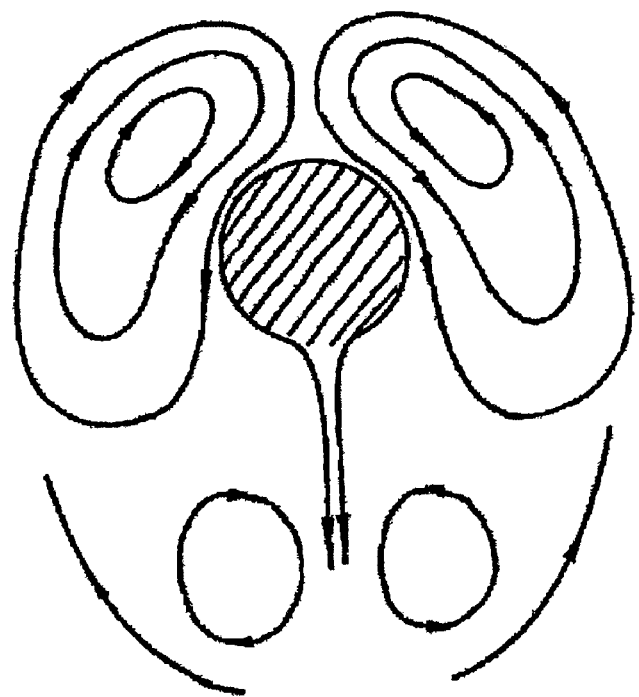
FIG. 22 shows EO2 flows around a particle, which can be seen to be mainly circular.

The additional conditions for directed EO2 pumping according to the present invention will now be presented.
1. The conducting material surface must be smooth, otherwise no directed EO2 transport are obtained (circular flows could appear).
2. For spheres, the flow pattern in FIG. 22 is observed. This means that the flow will be reversed at a certain distance from the sphere. Thus, there should only be a limited window close to the particles constituting the conducting means which is available for liquid flow, and this determines the distance between the conducting particles, and between the conducting particles and other solid materials, e.g. the channel walls. It was found from experiments that the particles should be kept at a distance of below $2a_{char}$, preferrably between ⅛ and ½ $a_{char}$, in order to obtain a directed flow.

Some structures not pertaining to this, e.g. a monolayer of conducting granules could also be used, but this is less preferable, as the flow would be reduced A packed structure of more than one layer, could not be used, as only circular flow would be obtained by EO2. Also, non porous layers on any side of the conducting means in the flow direction, would stop any directed EO2 flow.
3. For other shapes of conducting material, the structural properties should be similar. Thus, the conducting particles should be kept at a distance between ⅛ and ½ of their characteristic dimensions $a_{char}$, as defined in this text.

Electric Signal

The electric signal can consist of an alternating voltage with square-triangular-sawtooth-sine- or other shape. The frequency must be below the hydrodynamic frequency, as illustrated in 28. Thus, $a_{char}=1$ mm gives f_max=1 Hz, $a_{char}=100$ μm gives f_max=100 Hz, and $a_{char}=10$ μm gives f_max=10 kHz. A frequency ten times lower than this theoretical maximum should be used, in order to obtain a significant period of flow in each pulse.

For symmetrical conducting means geometry, the signal should preferably have a duty cycle, and more preferably a duty cycle of 29%, meaning that the strong pulse (which should have the polarity giving EO2 flow in the desired direction) should have a duration of 29% of the signal period. When using a duty-cycle, the signal should preferably have an offset, which is chosen so that the average signal direct component is zero.

For conducting means with a broken symmetry (e.g. FIGS. 10 and 11) a symmetrical alternating signal could be used (square- triangular- sawtooth- sine- or other shape).

For applications where electrode reactions are not a problem (e.g. when short operating time and dilute solutions) a direct voltage component or a pure direct voltage could be used.

Preferably, the electric power should be delivered in the potentiostatic regime, which gives the fastest polarization.

For micropumps based on four electrodes, two alternating signals which are out of phase with each other should be applied between the two corresponding electrode pairs. Thus, the pulse pattern could follow the sequence:
1. Pulse normal to flow building up the SCR
2. Starting during pulse (1): the pulse parallel to flow resulting in EO2 transport
3. Opposite normal to flow pulse leading to depolarization of SCR and corresponding electrode pair
4. Opposite parallel to flow pulse leading to depolarization of corresponding electrode pair.

The signal could also be interrupted by a pause with no signal, which could occur for every N cycle of the signal, N being a number equal to or larger than one. The signal should be controlled by an electronic device (microchip or computer), and it could be automatically or manually changed and controlled during operation. This could be done based on information of the system performance obtained from the system microsensors.

Preferably, the signal frequency should be chosen to be higher than the inverse electrode polarization time, $$t_{pol\_el} = \frac{L}{\kappa D} \qquad \text{Equation 7}$$

where L is the distance between electrodes, $\kappa$ is the inverse Debye length (inverse EDL thickness), and D the diffusion coefficient of current carrying ions.

If an alternating or pulse electric signal should be applied, the maximum frequency is determined by the hydrodynamic time constant, $$t_{HD} = \frac{a_{char}^2}{v} \qquad \text{Equation 8}$$

where v is the kinematic viscosity of the liquid.

Production, Materials, Example Systems

Microfluidic devices can be produced by means of micromachining and processing techniques used in the microelectronics industry. This also applies to the micropumps according to the present invention. These methods allows one to make charnels as well as 3 dimensional structures into a substrate (silicon, glass or polymer), and also depositing conducting structures (metals or polymer) into the channels. Such methods have the same advantages with regard to cheap mass production, as microelectronics.

The micropumps according to the present invention, could also be produced by other methods and materials, e.g. for pumps placed inside thin glass capillaries.

Conducting or non-conducting films can be deposited onto the substrate (e.g. a circular silicon wafer with thickness 0.4 mm). Channels and other structures can be patterned by lithographic methods, applying radiation through a photoresist (mask). 3 dimensional conducting structures can be made inside channels, e.g. by electroplating of metals.

The micromachining technology offers a large number of techniques which can be combined in a practically unlimited number of ways, allowing for production of almost any structure. Here, only a few examples will be included. It should be noted that other materials (e.g. glass or polymer instead of Si substrate) and methods could be used.

In FIG. 6 is shown a sideview of part of a microchannel, including the area reserved for the micropump. It shows the substrate 12 including Si wafer (or polymer or glass), and top plate (glass or Si or polymer). The area 20a reserved for the conducting means is indicated by the (not necessarily physical) boundaries. Examples of the structure in this section are shown in FIG. 8-11. Here, the electrodes 16 consist of metal wires going through holes in the top plate. The electrodes could also be produced by the methods described above.

A top view of the same structure is shown in FIG. 7.

The conducting means 18 shown in FIG. 8-11 could be produced by the electroplating method. It could also be produced by micromolding (e.g. micro injection molding) of conducting polymers. Another possibility is to etch the circular or sloping material into the Si wafer, following doping for making it conductive.

For conducting means with a broken symmetry (as in FIGS. 10 and 11), a symmetrical alternating electric signal could be used.

Another possibility is to introduce the conducting means by mechanically placing some ready-made conducting means (e.g. spheres or fibres of ion-exchanger, carbon, metal or conducting polymer or other) into the channels. The conducting means can then be fixed by a mechanical pressure between channel bottom and top plate, into which small cavities can be etched for keeping the material in the correct position. They could also be fixed by means of some binder or other method.

The wide pump shown in FIG. 12, as well as the pump with conducting walls in FIG. 13 can also be produced as described above.

The micropump shown in FIG. 15 could be produced by micromolding techniques, or by using a special tubular membrane.

The four-electrode pump in FIG. 16 could consist of the following materials: tubular ion-exchange membrane, metal tube concentric to this membrane, by wrapping metal foil, or depositing metal onto the membrane, a stiff metal wire equipped with sections of isolation for avoiding contact to the membrane.

It should be mentioned that the pumping direction indicated on the figures could be reversed, by reversing the electric signal.

Generally, any electron-, ion- or hole conductor could be used as the conducting means, as long as its conductivity is at least 5 times that of the liquid which should be transported, preferably 10 times or more. Example materials includes doped silicone and other semiconductors, metals, ion-exchanger such as sulfonated polystyrene crosslinked with divinylbenzene (PS-DVB), conducting polymer (e.g. doped polyaniline (PANi), polyethylene or other doped polymer), carbon, graphite, or a polymer filled with some of said conducting materials.

The substrate could be silicone, glass or polymer or other materials. Typically, the microfluidic system is produced on a circular (diameter 10 or 15 cm, thickness 0.4 mm) silicon wafer. Each wafer can contain one or a number of microsystems.

The electrodes could be made of any electron-conducting material. Typically micromachined metal electrodes will be used, but graphite or carbon or doped Si are other possibilities.

Applications

The main applications of the micropumps or microactuators according to the present invention will be described. Generally, the micropump according to the present invention could transport liquid between positions inside the microsystem, between the microsystem and the outside (introducing samples to the system, delivering liquids to other systems or the human body etc). In most applications it should directly pump the liquid of interest, but the pump could also be used as an actuator indirectly driving other microdevices by pumping a liquid towards this (e.g. a membrane for reciprocating pump could be activated by pumping a liquid towards and away from the side of the membrane not in contact with the liquid to be pumped). Another application of the present invention is to mix the liquids on a microscale, by allowing some circular EO2 motion to remain.

Lab-on-a-Chip

This class of systems which are also referred to as Micro-Total-Analysis Systems (μ-TAS) or microlaboratories is highly compact systems equipped with several chemical and physical sensors and analysis devices. The actuators are needed for mixing and transporting liquids inside the system, as well as transport between the system and the environment. Lab-on-a-Chip systems are designed to perform analyses which otherwise requires traditional laboratory work. Also, chemical synthesis could be done in these systems.

The advantages compared to traditional analysis includes
- dramatically less labor consuming compared to traditional laboratory analysis
- only microscopic amount of samples and chemicals are needed
- dramatically less time consuming
- small portable systems can be made
- dramatically cost reduction and capacity increase Some example applications are listed below:
- medical analysis which today requires time- and labor consuming laboratory analyses, could be done in seconds at the medical office, in the field or at home (sending data to the medical office).
- Proteomics and DNA analysis are today technology limited sciences. Development of Lab-on-a-Chips systems could increase the capacity for analysis dramatically.
- Drug development: Introduction of Microsystems could greatly reduce the cost and time of developing new drugs.
- Chemical development: faster, safer and cheaper than traditional laboratory work.
- Medical applications include point of care clinical analysis.

Several automated systems exist today, especially in the field of medical analysis.

As mentioned, the missing component for developing Lab-on-a-chip systems, is the micropump. Typical pump performance should be 2 μl/min at 100 Pa pressure.

Very small pumps could be used for implantable devices delivering drugs (e.g. insulin for diabetes patients) to the body. This system could be controlled by measurements on the body (glucose level in the case of diabetes). Long time reliability, no electrode reactions and low voltage are important characteristics of such pumps. Typically, a few nl/min should be delivered by the pump.

Cooling

A microscale cooling cycle could solve the problem of getting rid of heat in microelectronics. The pump of this system should typically deliver 10 ml/min at a pressure above 1 atm. The pump and heat exchanger (cooling device) could be integrated into separate or the same microchip, while the heat exchanger should consist of micromachined or other fine tubes in contact with the environment.

Experimental Results

Simple experiments were performed, demonstrating EO2 mixing and directed transport in Microsystems. The experimental setup is described in FIGS. 18 to 20. The microfabricated hole-plates made it possible to place granules of a chosen size within a chosen distance of each other.

DOWEX 50 WX 8 strongly acidic cation-exchange granules were used in the experiments. The width of the hole-plate was 0.4 mm (measured in the flow direction).

Micromixer

A row of ion exchange particles with diameter ($d_{char}$) approximately 600 μm was placed in the hole plate. Different from the configuration in FIG. 20, one particle was placed in every second hole, leaving a space of 2 $a_{char}$ between adjacent particles.

Experiments were conducted using colored small particle to observe flows, and observations was done using a light microscope. The colored particles was placed inside the EO2 mixer (between the hole plates, but not in the reservoirs).

| Electric signal | observations |
| --- | --- |
| DC, E = 0.6 V/mm | Circular flow becomes apparent |
| DC, E = 1.3 V/mm | Faster circular flow |
| DC, E = 3.5 V/mm | Very fast circular flow, several mm/sek |
| DC, E = 5.2 V/mm | Further increase in velocity |
| AC, 5 V in strong pulse, 20% duty cycle, 0.1 Hz | Fast flow in the strong pulse, slower flow in the weak pulse. |

In all cases, flow patterns similar to that shown in FIG. 22 was observed. As the colored particles did not leave the pump after several minutes of applying the signal, it can be concluded that only circular motion was present, and no (significant) directed pumping. This was expected, as the particle distance greatly exceeded one particle radii $a_{char}$, beyond which a flow reversal is observed. The reason for using a low frequency AC signal, was the relatively large conducting particle size in this experiment.

Micropump

A micropump was made by placing a row of ion-exchange particles (diameter approximately 400 μm) in adjacent holes in the hole plate, leaving a space of somewhat smaller than one particle radii $a_{char}$ between them.

| Electric signal | observations |
| --- | --- |
| DC, E = 1.3 V/mm | Directed flow through the pump, approximately 0.2 mm/s |
| DC, E = 3.5 V/mm | Directed flow through the pump, approximately 1 mm/s |
| DC, E = 5.2 V/mm | Directed flow through the pump, approximately 2 mm/s |
| AC, 5 V in strong pulse, 20% duty cycle, 0.1 Hz | Directed flow through the pump, average velocity approximately 0.5 mm/s |

This shows that large flowrates can be obtained using very low potential differences, and also that an alternating field can be used. In the experiments, an electrode distance of approximately 10 mm was used. In practice, electrode distances could be in the order of 1 mm. Thus, flow velocities in the order of mm/s can be obtained for a potential difference in the order of 1 V for microactuators according to the present invention, while for actuators reported elsewhere potential differences in the kV range are usually required for obtaining the same velocities.

As the distance between ion exchange particles was much larger than optimal, a further increase in velocity is possible without increasing the voltage.

The invention claimed is:

1. A microfluidic system comprising:
a microchannel;
a pump; and
electrical connection means for application of an electric field across a segment of said microchannel,
wherein said segment comprises conducting means,
wherein the conducting means comprises a perm selective ion conducting material, and
wherein a surface portion of said conducting means is curved, or inclined, with respect to the electrical field, whereby, in use, the electric field has a component tangential to the surface portion and a component normal to the surface portion, such that fluid flow is induced in said microchannel segment under the action of secondary electroosmosis.

2. The system as claimed in claim 1, wherein the system is a fluid network formed in a substrate,
wherein the conducting means is disposed in the segment of said microchannel and the electrical connection means comprises electrodes positioned to apply the electric field across the segment, and wherein the space between the conducting means and the walls of the microchannel, and between different conducting means, is between 0 $a_{char}$ and 2 $a_{char}$, the surface of the conducting means being smooth such that the surface irregularities are less than 5% of $d_{char}$.

3. The system as claimed in claim 2, wherein the space between the conducting means and the channel walls, and between different conducting means, is between ⅛ $a_{char}$ and ½ $a_{char}$, and wherein the surface irregularities are less than 1% of $d_{char}$.

4. The system as claimed in claim 2, wherein the conducting means has the shape of an ellipsoid, sphere, cylinder or elliptical cylinder.

5. The system as claimed in claim 2, wherein the conducting means consists of a small cylinder with the longitudinal axis normal with respect to the fluid flow direction.

6. The system as claimed in claim 2, wherein the conducting means has the shape of a particle with planes which are inclined with respect to the imposed electric field.

7. The system as claimed in claim 6, wherein the particle constituting the conducting means has a size of 0.1 μm-5 mm, measured in parallel to the externally imposed electric field.

8. The system as claimed in claim 7, wherein the particle constituting the conducting means has a size of 1.0 μm to 500 μm measured in parallel to the externally imposed electric field.

9. The system as claimed in claim 6, wherein the angle λ between the inclined surface portion and the microchannel walls is 1-80 degrees.

10. The system claimed in claim 9, wherein, the angle λ between the inclined surface portion and the microchannel walls is 30-60 degrees.

11. The system claimed in claim 2, wherein the conducting means contains several layers of conducting particles, spaced both axially and longitudinally in relation to the flow direction.

12. The system claimed in claim 2, wherein the conducting means has a conductivity of at least 5 times the conductivity of said fluid.

13. The system claimed in claim 12 wherein the conducting means has a conductivity of at least 10 times the conductivity of said fluid.

14. The system as claimed in claim 2, wherein the electrodes are arranged upstream or downstream with respect to the microchannel segment.

15. The system as claimed in claim 2, wherein the electrodes are adapted to provide an electrical field parallel to the direction of the transported fluid.

16. The system as claimed in claim 2, wherein the electrodes are arranged to apply an alternating field.

17. The system as claimed in claim 2, wherein the electrodes are arranged to apply an alternating field which has sine, square, triangular or sawtooth shape, or a combination of said shapes.

18. The system as claimed in claim 2, wherein the electrodes are arranged to apply an alternating field where the signal has an offset resulting in a strong and a weak pulse within the signal period, and also a duty-cycle of 29%, so that the strong pulse lasts 29% of the signal period, and where the offset and duty cycle are tuned to give a zero average direct electric signal component.

19. The system as claimed in claim 2, wherein the electrodes are arranged to apply an alternating field where the signal has an overloaded direct component.

20. The system as claimed in claim 2, wherein the electrodes are arranged to apply an alternating field where the electric signal is applied in the potentiostatic regime.

21. The system as claimed in claim 2, wherein the electrodes are arranged to apply an alternating field with a maximum amplitude in V/mm equal to or larger than an amplitude for which the base $-10$-logarithm is the linear interval between $-2$ and 2, for corresponding $a_{char}$, measured in μm, for which the base $-10$-logarithm is in the linear interval between 0 and 3.7.

22. The system as claimed in claim 2, wherein the electrodes are arranged to apply an alternating field with a signal period in seconds equal to or larger than a period for which the base $-10$-logarithm is in the linear interval between $-6$ and zero, for corresponding $a_{char}$, measured in μm, for which the base $-10$-logarithm is in the linear interval between 0 and 3.

23. The system as claimed in claim 2, wherein the electrodes are arranged to apply a direct electric field.

24. The system as claimed in claim 2, wherein the distance between each electrode and the conducting means is between 0.1 and 5 mm.

25. The system as claimed in claim 2, wherein the electrodes comprise four electrodes, a first pair of electrodes for inducing the SCR, and a second pair of electrodes for setting ions in the fluid in motion.

26. The system as claimed in claim 25, wherein a first pair of electrodes is arranged upstream or downstream of said segment of the microchannel, anywhere in the microchannel or microfluidic system, and wherein the second pair of electrodes is positioned on each side of said segment.

27. The system as claimed in claim 25, wherein the first pair of electrodes and the second pair of electrodes each applies an alternating electric field, where the two electric fields are out of phase.

28. The system as claimed in claim 2, wherein the conducting means is a portion of the microchannel wall effecting a deflection of the local electrical field so that the field is inclined with respect to the conducting means.

29. The system as claimed in claim 1, arranged to act as a micropump.

30. The system as claimed in claim 29, wherein the system is part of a lab-on-a chip assembly.

31. The system as claimed in claim 29, arranged to provide electronics cooling.

32. The system as claimed in claim 1, arranged to act as a mixer.

33. The system as claimed in claim 1, arranged to provide drug delivery.

34. A method for pumping fluid in a microchannel wherein said microchannel is in a microfluidic system as claimed in claim 1.

35. A system as claimed in claim 1, wherein the conducting means has a characteristic dimension which is its dimension measured parallel to the electric field and which is at least 10 µm, and wherein a flow passage is defined between said surface portion of the conducting means and another conducting means or between said surface portion and a portion of the wall of said microchannel, the flow passage having a minimum diameter of at least 1/16 of the characteristic dimension of said conducting means.

36. A system as claimed in claim 35, wherein the characteristic dimension of the conducting means is between 10 µm and 500 µm.

37. A system as claimed in claim 35, wherein the minimum diameter of the flow passage is between 1/16 and 1 times the characteristic dimension of the said conducting means.

38. A system as claimed in claim 35, wherein the surface of the said conducting means is smooth such that any surface irregularities are less than 5% of the characteristic dimension thereof.

39. A system as claimed in claim 35, wherein the surface of the conducting means is at an angle of between 30 and 60 degrees to the direction of the electric field.

40. A system as claimed in claim 35, wherein the conducting means has a conductivity of at least 5 times that of a liquid which in use is to flow in the microfluidic system.

41. A system as claimed in claim 35, wherein the microfluidic system is arranged on or in a substrate.

42. A system as claimed in claim 35, wherein the electrical connection means comprises a pair of electrodes respectively arranged upstream and downstream with respect to the microchannel segment, and wherein the distance between each electrode and the said conducting means is between 0.5 and 5 mm.

43. A system as claimed in claim 35, wherein the microchannel has an inlet and an outlet, and the pump is arranged to cause fluid to flow from the inlet, along the microchannel and adjacent to said surface of the conducting means, to the outlet.

44. A method for pumping fluid in a microchannel wherein said microchannel is in a microfluidic system as claimed in claim 1, the method comprising applying said electric field to cause fluid to flow under the action of secondary electroosmosis.

45. A method as claimed in claim 44, wherein an electric field E is applied to said member, and wherein $E > 0.013 \text{ V}/a_{char}$ where V is the potential drop across the characteristic dimension of the conducting means and $a_{char}$ is 0.5 times the characteristic dimension.

46. A method for pumping fluid in a microchannel comprising:
the step of applying an electric field to a segment of the microchannel, the segment comprising:
conducting means, the conducting means comprising a perm selective ion conducting material and having a surface portion which is curved or inclined with respect to the electric field, whereby the electric field has a component tangential to the surface portion and a component normal to the surface portion, to cause fluid in said microchannel segment to flow as a result of secondary electroosmosis.

47. The method as claimed in claim 46, wherein said electric field is an asymmetric alternating field.

48. The method as claimed in claim 47, wherein, with one polarity, said electric field is insufficient to cause fluid to flow as a result of secondary electroosmosis.

49. The method as claimed in claim 48, wherein a time integral of said electric field is zero.

* * * * *